US012504862B2

(12) United States Patent
Hawkins et al.

(10) Patent No.: US 12,504,862 B2
(45) Date of Patent: Dec. 23, 2025

(54) BROWSER TAB MANAGEMENT

(71) Applicant: Google LLC, Mountain View, CA (US)

(72) Inventors: Kayce Audra Hawkins, Seattle, WA (US); Edward Jung, London (GB); Joel Roger Beukelman, Franklin, TN (US); Sébastien Marchand, Laval (CA); Xialin Yan, Seattle, WA (US); Dana Fried, Seattle, WA (US); Christopher Matthew Lee, Long Island City, NY (US); Bret Alan Sepulveda, Munich (DE); Monica Estela Gonzalez Veron, Oakland, CA (US); Collin Henry Baker, Seattle, WA (US); Taylor Bergquist, Seattle, WA (US); Connie Lee Wan, Seattle, WA (US); Mark Chang, Seattle, WA (US); Samuel Birch, Seattle, WA (US); Rachel Karin Popkin, Seattle, WA (US); Alan Bettes, San Francisco, CA (US); Daniel June Hyung Park, Pasadena, CA (US); Lukas Schubsda, Oakland, CA (US); Jason Randolph, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/302,782

(22) Filed: May 12, 2021

(65) Prior Publication Data
US 2022/0365639 A1 Nov. 17, 2022

(51) Int. Cl.
*G06F 3/0483* (2013.01)
*G06F 3/0482* (2013.01)
(Continued)

(52) U.S. Cl.
CPC .......... *G06F 3/0483* (2013.01); *G06F 3/0482* (2013.01); *G06F 3/165* (2013.01); *G06F 16/954* (2019.01)

(58) Field of Classification Search
CPC ...... G06F 3/0483; G06F 3/165; G06F 16/954; G06F 3/0482; G06F 16/957
See application file for complete search history.

(56) References Cited

U.S. PATENT DOCUMENTS 8,799,807 B2   8/2014  Molander et al.
9,332,056 B2 * 5/2016  Ross ..................... H04L 43/062
(Continued)

OTHER PUBLICATIONS

International Search Report and Written Opinion for PCT Application No. PCT/US2022/072285, mailed on Aug. 16, 2022, 16 pages.
(Continued)

*Primary Examiner* — Kenny Nguyen
(74) *Attorney, Agent, or Firm* — Brake Hughes Bellermann LLP

(57) ABSTRACT

Systems and methods are described that include receiving, in a tab strip generated by a web browser application, a request to generate a tab group, generating the tab group, in response to receiving the request, where the generating includes generating a tab group identifier for the tab group, enabling pausing or starting of an activity associated with a resource accessed by a browser tab within the tab group based on whether the tab group is collapsed or expanded, and storing metadata about the tab group and the browser tab included in the tab group. The systems and methods may further include causing display of the generated tab group in the tab strip with the tab group identifier depicted in at least a portion of a user interface associated with the browser tab where the generated tab group is configured for display based on the metadata.

27 Claims, 20 Drawing Sheets

(51) Int. Cl.
*G06F 3/16* (2006.01)
*G06F 16/954* (2019.01)

(56) References Cited

U.S. PATENT DOCUMENTS

| | | | | |
|---|---|---|---|---|
| 9,367,211 | B1* | 6/2016 | Turner | G06F 9/50 |
| 9,529,517 | B2* | 12/2016 | Jitkoff | G06F 3/04842 |
| 9,658,747 | B2* | 5/2017 | Rossi | G06F 3/0483 |
| 9,881,096 | B1* | 1/2018 | Warr | G06F 16/954 |
| 9,921,632 | B2* | 3/2018 | Mondal | G06F 1/329 |
| 9,971,847 | B2* | 5/2018 | Bhupatiraju | G06F 16/9577 |
| 10,338,783 | B2* | 7/2019 | Barrus | G06F 3/04842 |
| 10,616,652 | B2* | 4/2020 | Chang | H04N 21/2662 |
| 10,642,466 | B2* | 5/2020 | Dipin | G06Q 10/10 |
| 11,106,756 | B2* | 8/2021 | Chikkala | G06F 16/954 |
| 2011/0016417 | A1* | 1/2011 | Shiplacoff | G06F 3/04842 |
| | | | | 715/768 |
| 2012/0131485 | A1* | 5/2012 | Svendsen | G06F 3/0483 |
| | | | | 715/777 |
| 2013/0014047 | A1* | 1/2013 | Joo | G06F 9/451 |
| | | | | 715/777 |
| 2014/0333633 | A1* | 11/2014 | Zhang | H04N 21/42653 |
| | | | | 345/503 |
| 2015/0095838 | A1* | 4/2015 | Rossi | G06F 3/0483 |
| | | | | 715/777 |
| 2015/0346929 | A1* | 12/2015 | Karunamuni | G06F 3/0488 |
| | | | | 715/777 |
| 2016/0019194 | A1* | 1/2016 | Mondal | G06F 1/329 |
| | | | | 715/234 |
| 2016/0139750 | A1* | 5/2016 | Barrus | G06F 3/0483 |
| | | | | 715/777 |
| 2017/0039206 | A1* | 2/2017 | Broomhall | G06F 16/954 |
| 2017/0199638 | A1* | 7/2017 | Bhupatiraju | G06F 16/9577 |
| 2017/0205978 | A1* | 7/2017 | Rossi | G06F 3/0483 |
| 2017/0357729 | A1* | 12/2017 | Romanenko | G06F 3/048 |
| 2018/0041809 | A1* | 2/2018 | Chang | H04N 21/4333 |
| 2018/0246624 | A1* | 8/2018 | Barrus | G06F 16/9577 |
| 2020/0394234 | A1* | 12/2020 | Chikkala | G06F 16/9577 |
| 2022/0092133 | A1* | 3/2022 | Devereux | G06F 3/0482 |

OTHER PUBLICATIONS

Anonymous, "Chrome Expanding Tab Freezing to Collapsed Tab Groups", Techdows, retrieved on Aug. 1, 2022 from https://techdows.com/2020/07/chrome-freeze-tab-groups-collapse.html, Jul. 29, 2020, 4 pages.

Smith, "How to Enable Tab Freezing in Google Chrome", Winaero, retrieved on Aug. 1, 2022 from https://winaero.com/enable-tab-freezing-in-google-chrome/, Dec. 27, 2019, 4 pages.

Tkachenko, "Enable Tab Groups Collapse in Google Chrome", Winaero, retrieved on Aug. 1, 2022 from https://winaero.com/enable-tab-groups-collapse-in-google-chrome/, May 19, 2020, 6 pages.

* cited by examiner

BROWSER TAB MANAGEMENT

BACKGROUND

Conventional web browsers allow users to navigate to different websites via a web browser application. While navigating the websites, the web browser application may generate a number of browser tabs. Each browser tab may be associated with a previously-visited web page. The browser tabs may enable a user to return to the associated web page in response to selecting one of the browser tabs.

SUMMARY

The systems and methods described herein may generate and present a tab organizing tool that may be used to curate, collect, and organize online content into one or more groups of browser tabs. As an alternative to conventional systems, which allow the user to open tabs while shrinking the real estate of all tabs when each new tab is opened, the solutions described herein can enable the user to group tabbed content according to user preference and user-generated nomenclature (e.g., tab group name/identifiers, colorization, icons, etc.). The browser tabs may be organized into tab groups to allow for later recognition by the user, based on the user-generated nomenclature, which may allow the user to quickly find desired browser tabs.

In some implementations, the tab groups may be presented in a tab strip with the browser tabs. For example, browser tabs associated with a tab group may be displayed in the tab strip and may belong to the tab group. Other browser tabs may be displayed in the tab strip along with any number of tab groups and associated browser tabs of the tab groups.

In some implementations, each individual tab group of browser tabs may be expanded or collapsed. For example, if the user views a first group of browser tabs, the user may select the user-generated tab group indicator (e.g., header, name) associated with the first group of browser tabs to expand the first group of browser tabs in the tab strip. In response, the systems and methods described herein may display each browser tab in the first tab group in the tab strip (or other browser portion depicting tab groups). The user may then select a browser tab to view the content displayed in an associated browser window. Similarly, if the user hides browser tabs in the first tab group, the user may select the tab group indicator to collapse (e.g., remove from view) the browser tabs associated with the first tab group. The user may select other tab groups to collapse or expand those tab groups and the systems and methods described herein may respond with collapsing or expanding the other tab groups. Thus, a user may view a tab strip with multiple tab group indicators. A particular tab group indicator may be selected to expand the associated browser tabs. The associated browser tabs may be displayed alongside the other collapsed tab groups (e.g., rendered as tab group indicators in the tab strip). In this fashion, real estate (e.g., space) in the tab strip may be saved while the user of the tab strip is provided an organization structure for the tab strip.

In general, a tab group in an expanded state may utilize more real estate in the tab strip than a tab group in a collapsed state. In a collapsed state, the tab group and corresponding browser tabs are collapsed within a small browser tab (e.g., indicating the tab name) leaving room for opening new tabs or viewing ungrouped tabs. In some implementations, the technical solutions described herein may enable a user to select any of the user-generated tab groups as a dormant group of tabs. That is, if the user chooses to collapse a group of tabs, the collapsed group of tabs may be triggered to cease (e.g., terminate, stop) communicating with (e.g., disconnect from) the underlying website associated with the tab. Ceasing communication with the underlying website may provide an advantage of allowing the computing system to use a reduced amount of memory and processing resources because obtaining and rendering of the web content of the collapsed tabs may be temporarily paused.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In a first general aspect, a computer-implemented method is described that includes receiving, in a tab strip generated by a web browser application, a request to generate a tab group, generating the tab group, in response to receiving the request, where the generating includes generating a tab group identifier for the tab group, enabling pausing or starting of an activity associated with a resource accessed by a browser tab within the tab group based on whether the tab group is collapsed or expanded, and storing metadata about the tab group and the browser tab included in the tab group. The systems and methods may further include causing display of the generated tab group in the tab strip with the tab group identifier depicted in at least a portion of a user interface associated with the browser tab where the generated tab group is configured for display based on the metadata.

Implementations can include any or all of the following features. For example, the method may further include collapsing the browser tab into the tab group to trigger the pausing of the activity, in response to receiving a first selection on the tab group identifier. The method may further include expanding the browser tab from the tab group to trigger the starting of the activity, in response to receiving a second selection on the tab group identifier. In some implementations, collapsing the browser tab into the tab group removes at least a portion of the tab strip from display in the web browser application and pauses execution of portions of a browser process associated with the browser tab.

In some implementations, the metadata includes at least data indicating a freeze flag decision for the browser tab indicating whether to allow the pausing or starting of the activity associated with the resource, a browser tab state flag indicating whether the browser tab is in a collapsed state or expanded state, and connection data associated with the resource.

In some implementations, the method further includes disabling the pausing for the activity associated with the resource in response to determining that content provided by the resource accessed by the browser tab includes streaming audio data. In some implementations, storing the metadata enables restoration of the tab group and associated browser tab according to the metadata in response to detecting a request to reopen the web browser application. In some implementations, the method further includes disabling the pausing for the activity associated with the resource in response to determining that the resource accessed by the browser tab is configured to reject resource pause requests associated with the browser tab. In some implementations, the method further includes disabling the starting of the activity associated with the resource accessed by the browser tab, in response to determining that the browser tab is configured with a permission to reject a start request detected to be triggered by a command to expand the tab group.

In some implementations, the method further includes generating a plurality of additional tab groups, each additional tab group associated with a respective plurality of browser tab and for each additional tab group, the method may assign a visual indicator to the respective plurality of browser tabs where input received on the visual indicator causes collapsing or expansion of the respective plurality of browser tabs in the respective tab group and may also enable access to a menu generated by the browser application. The menu may be configured to apply modifications to a respective tab group in the plurality of additional tab groups.

In some implementations, the activity includes memory or processing activities used for communicating with the resource, accessing the resource, or executing the activity associated with the resource. The resource may include at least one of a website, a web page, an application, a web application, an online document, a social networking platform, a link, and a network. In some implementations, the request to generate the tab group is received in a menu generated by the web browser application where the menu provides at least an option to add any number of additional browser tabs to the tab group.

In another general aspect, a system is described that includes a tab group generator configured to receive, in a tab strip generated by a web browser application, a request to generate a tab group and generate the tab group, in response to receiving the request. The generating may include generating a tab group identifier for the tab group, and enabling pausing or starting of an activity associated with a resource accessed by a browser tab within the tab group based on whether the tab group is collapsed or expanded. The tab group generator may also be configured to store metadata about the tab group and the browser tab included in the tab group. The system may also include a renderer configured to cause display of the generated tab group in the tab strip with the tab group identifier depicted in at least a portion of a user interface associated with the browser tab where the generated tab group is configured for display based on the metadata.

Implementations can include any or all of the following features. In some implementations, the tab group generator is further configured to enable pausing of the activity enables collapsing of the browser tab into the tab group to trigger pausing of the activity, in response to receiving a first selection on the tab group identifier and enable starting of the activity enables expansion of the browser tab to trigger starting of the activity in response to receiving a second selection on the tab group identifier. In some implementations, collapsing the browser tab into the tab group removes at least a portion of the tab strip from display in the web browser application and pauses execution of portions of a browser process associated with the browser tab.

In some implementations, the metadata includes at least data indicating a freeze flag decision for the browser tab indicating whether to allow the pausing or starting of the activity associated with the resource, a browser tab state flag indicating whether the browser tab is in a collapsed state or expanded state, and/or connection data associated with the resource.

In some implementations, the tab group generator is further configured to disable the pausing for the resource in response to determining that content provided by the activity associated with the resource accessed by the browser tab includes streaming audio data. In some implementations, the request to generate the tab group is received in a menu generated by the web browser application, the menu providing at least an option to add any number of additional browser tabs to the tab group.

In yet another general aspect, a computer-implemented method is described that includes receiving, in a tab strip including a plurality of browser tabs generated by a web browser application, a request to generate a tab group for at least a portion of the plurality of browser tabs. In response to receiving the request, the method may include generating the tab group, where the generating includes modifying a first browser tab, in the portion of the plurality of browser tabs, to receive a tab group name for display on the first browser tab and enabling a command to expand and collapse the portion of the plurality of browser tabs. The method may further include causing rendering of the tab group configured with the enabled command and with the portion of the plurality of browser tabs including a visual indication associating the portion with the tab group, the portion being rendered in the tab strip with a remaining portion of the plurality of browser tabs.

Implementations can include any or all of the following features. In some implementations, the tab group caused to be rendered in the tab strip is triggered based on detecting input corresponding to the enabled command and the tab group name.

The systems and aspects above may be configured to perform any combination of the above-described aspects, each of which may be implemented together with any suitable combination of the above-listed features and aspects.

Implementations of the described techniques may include hardware, a method or process, or computer software on a computer-accessible medium. The details of one or more implementations are set forth in the accompanying drawings and the description below. Other features will be apparent from the description and drawings, and from the claims.

BRIEF DESCRIPTION OF THE DRAWINGS

The use of similar or identical reference numbers in the various drawings is intended to indicate the presence of a similar or identical element or feature.

DETAILED DESCRIPTION

Figure 1:
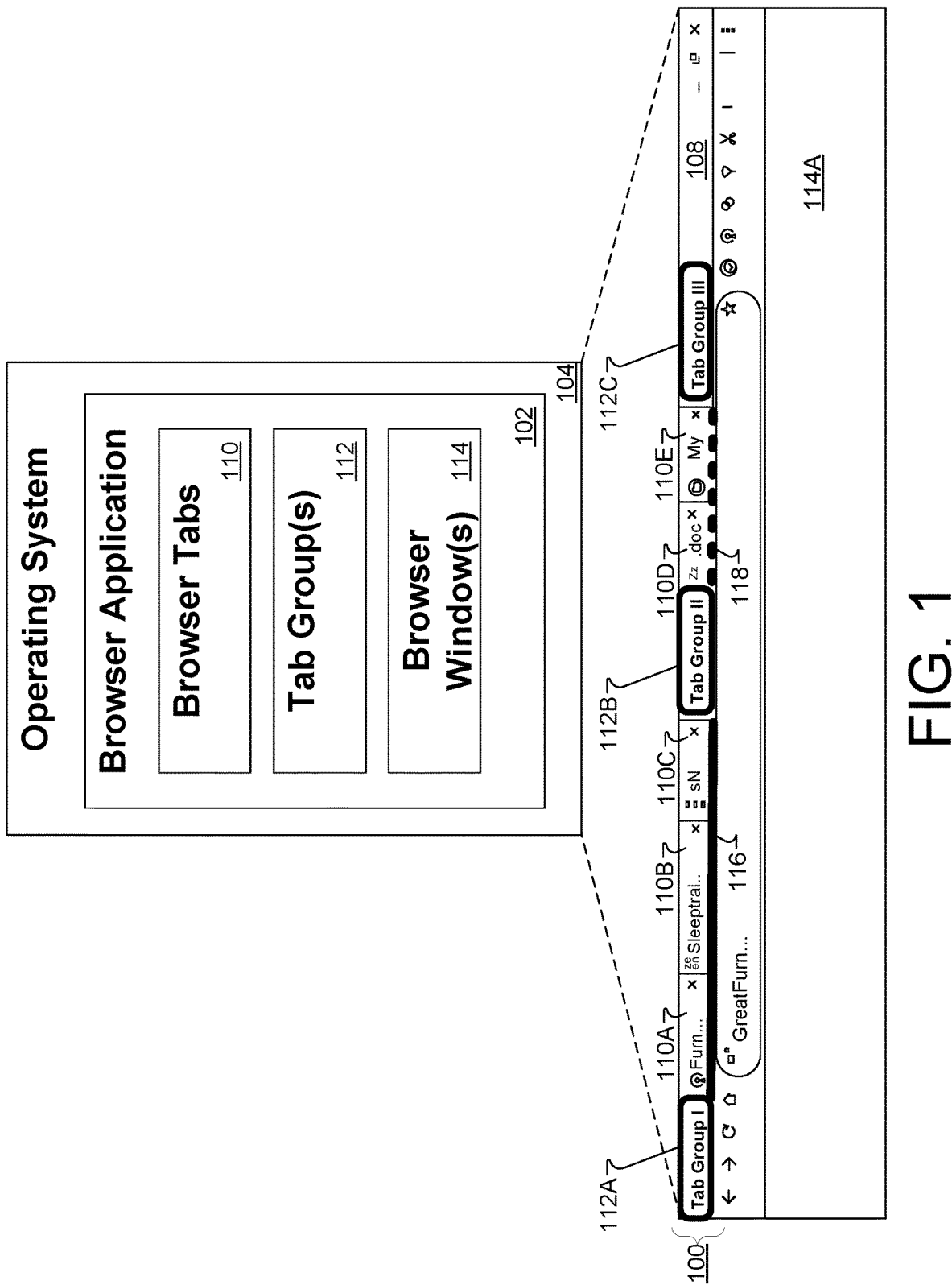
FIG. 1 is a block diagram illustrating an example tab group user interface (UI), in accordance with implementations described herein.

This document describes a browser tab organizing tool that provides a way to modify a display of browser tabs to facilitate organization of the browser tabs in a convenient and logical way. The browser tab organizing tool may enable users to group tabs according to user preference (e.g., website type, topics, priority, progress, task, time, etc.). The grouped tabs (e.g., tab groups) may be personalized, expanded, collapsed, moved to a new window, and/or moved within a browser tab strip, or other location within the browser user interface.

The grouped tabs may be color-coded, labeled, and/or otherwise visually indicated as belonging to a particular tab group. For example, the tab groups may include a modifiable and/or selectable label. In operation, a user may generate a new tab group and provide an identifier (e.g., name, label, etc.) by entering a name for the new tab group. The user may do so by selecting (e.g., right mouse click, keyboard shortcut, touch input, and the like) a browser tab. In response, the web browser may cause a menu to be presented to allow the user to generate the new tab group, label the new tab group, and optionally assign a color or other visual indicator to the new tab group. The selected browser tab may then be associated to the new tab group. In operation, each new tab group may include at least one customizable colored tab label, a color indicator (e.g., matching the colored tab label). In some implementations, the color indicator may include a colored or patterned visual element (e.g., a line, a shape, a shading, etc.) that is associated with each tab in the tab group to delineate between more than one tab group.

Each new tab group may also be associated with one or more menus configured to enable a user to modify and interact with the respective tab group. For example, the menu may be provided to generate, customize, and modify the respective tab group. Such menus may be provided in a pop-up manner and may be removed from view in response to (e.g., upon) expiring threshold times or via user request to be removed from view. Animations may occur when operating on and within tabs and tab groups. The animations may be configured to provide feedback and visual comfort to a user interacting with the tab groups and tab strip, in general.

A technical problem with displaying browser content on computing devices (e.g., desktops, laptops, tablets, mobile devices, augmented reality (AR)/virtual reality (VR) glasses, and the like) is that the displays and applications associated with such computing devices have limited areas, i.e. limited sizes and/or resolutions to display content and information to a user in a browser tab strip, for example. In the context of tabs for browsers, a technical problem with depicting many browser tabs in a computing device display is that a limited number of tabs can be presented in the limited area of the display while still maintaining readability for icons and titles that a user can associate with the underlying web page represented by the browser tab.

At least one technical solution to this technical problem is to present a tab strip in the display that is configured to receive instructions to generate tab groups for housing and/or organizing browser tabs. The tab groups may be configured to be easily condensed (e.g., collapsed) and expanded in response to user input. A user can, for example, generate one or more tab groups, associate browser tabs with at least one of the tab groups, and then provide a selection input to cause the browser tabs associated with a particular tab group to collapse into a tab group identifier (e.g., a reduced browser tab portion indicating a tab group name), thereby enabling other tab groups or other non-grouped browser tabs to use an increased amount of real estate in the tab strip. The increased amount of real estate may allow for easier recognition of the browser tab icons and titles. At least one technical benefit of the tab strip that includes tab groups is to be able to maintain access to a high number of open browser tabs and present the open browser tabs within the limited area of the display in response to user input.

In some implementations, the tab group organizational tool may allow tab groups to be generated and/or controlled by a browser process. For example, a browser process associated with the web browser may operate to freeze (e.g., pause, stop executing connections to a server, stop communicating with a resource, and the like) one or more tabs inside a particular tab group when the tab group is collapsed. The freeze operation can occur in response to a user input to collapse the tab group. The input may trigger a severing of one or more connections to an underlying web site associated with a respective browser tab associated with the tab group receiving the input. Severing the connection to the server may provide an advantage of saving memory and/or processing resources because severed connections can halt requests for data (e.g., activities) from the web browser to the respective servers for the particular browser tabs that are collapsed within the tab group.

Another technical problem with web browser applications may be that web browser applications do not provide a way to organize numerous browser tabs open in a browser window. In short, users often open browser tabs for web pages and intend to go back to any number of the tabs to review the web page content at a later time. However, as a user opens, closes, and moves many tabs throughout a day, the user may forget a location or look and feel of a particular tab that they wish to revisit. Users may become frustrated when unable to identify the content of the tabs without cycling through some or all of the open tabs.

The tab organizational tool for generating tab groups provides a technical solution to this technical problem in which the solution includes labeling and grouping browser tabs according to user-selected aspects, which allows the user to curate a browser tab strip to provide improved navigation efficiency when searching for content within open browser tabs. For example, an underlying browser process can be configured to generate a tab organizing tool (e.g., tab groups) that may be used to curate, collect, and/or organize online content into one or more grouped browser tabs. The technical solution may include a tab organizing tool that groups tabs according to user preference and enables a one click-and-drag movement of the grouped tabs within a tab strip. The technical solution may also provide one or more configuration menus to modify, customize, and generate additional tab groups. The technical solution may also enable a one click-and-drag movement to select and move the grouped tabs to generate a new instance of a browser window. The technical solution may also enable freezing (e.g., pausing) of tab connections (e.g., stop connecting to resources/servers/websites) for tabs in a tab group when the tabs are in a collapsed state and may be configured to reconnect to resources/servers/websites or to resume activities associated with the tabs when the tabs are in an expanded state.

The systems and methods described herein may be widely adapted to a variety of devices including smaller devices, such as mobile devices, tablets, and convertible laptop/tablets, as well as larger devices including laptops, desktops, and the like. For example, the tab groups may be touch or stylus enabled to allow for easy configuration and selection of tab groups. In addition, the systems and methods described herein may provide for organized access to content within browser tabs by providing multiple collapsible browser tab groups which can allow smaller devices to provide tabbed content with increased real estate because any number of tab groups may be collapsed while a single tab group is expanded for the user to focus upon. The systems and methods described herein may also provide easy drag-and-drop functions to add new tabs to a group and/or window. In addition, the systems and methods described herein can pause the use of processing and memory resources when tab groups are collapsed without depending upon explicit user instruction to pause each specific resource for each specific browser tab. This may free up processing and memory resources for other tasks.

The technical solutions described herein may provide a technical effect of improved content management, improved content access, and improved UI interactions. For example, the tab groups described herein may be widely adapted to a variety of devices including small devices such as wearables and mobile devices as well as larger devices including laptops, desktops, etc. The tab group tool described herein may provide for easy access to content items that more accurately represent user needs.

FIG. 1 is a block diagram illustrating an example tab group user interface (UI) 100, in accordance with implementations described herein. In general, tab groups represent an organizational tool that allows users to visually organize browser tabs. Tab groups can be generated via menus and/or inputs from a user. Browser tabs can be added to the generated tab groups in various ways. For example, a user may input a right-click mouse command to trigger a context menu from a browser tab strip. In another example, a user may long press in a touch input to trigger a context menu from a browser tab strip. The context menu may allow selection of generating a tab group.

The generated tab group may include a visual border (e.g., bounds) to separate the group from surrounding browser tabs and/or other tab groups in the tab strip. In some implementations, the generated tab group includes a header portion that includes a group identifier (e.g., name) and/or one or more group menu controls.

In operation, the UI 100 is generated and rendered by a browser application 102 executing in an operating system 104 of a computing device. The UI 100 is presented in a tab strip 108 associated with the browser application 102. In this example, the UI 100 includes a number of browser tabs 110 and tab groups 112. Each browser tab 110 may be associated with web content presented in a corresponding browser window 114 of the browser application 102.

In the example depicted in FIG. 1, a user may have triggered the browser application 102 to generate a first tab group 112A named "Tab Group I," a second tab group 112B named "Tab Group II," and a third tab group 112C, named "Tab Group III." The name of each tab group may be user-provided and as such, the names shown in the figures of this disclosure are provided for ease of explanation. For example, a user may use a naming mechanism based on workflow, topic, priority, progress, or other grouping method. In some implementations, the web browser may instead select a tab group name (e.g., label). For example, the web browser application 102 may learn a topic associated with one or more tabs indicated to be grouped into the first tab group 112A and may generate a topic-related label for the tab group. The learned topic and subsequent generated tab group name may trigger generation and population of a tab group name on a header portion of the tab group, for example.

Each tab group 112A, 112B, 112C may be configured to include any number of browser tabs. A user, for example, may select a number of browser tabs for addition to a particular tab group. For example, a user may select browser tab 110A, browser tab 110B, and browser tab 110C for addition to the first tab group 112A. Similarly, the user may select browser tab 110D and browser tab 110E for addition to the second tab group 112B. In this example, the user may have added one or more browser tabs to tab group 112C, but in this example, tab group 112C is collapsed and thus depicts no browser tabs in the UI 100. Although tab group 112C is collapsed, any number of browser tabs may be associated with the tab group 112C. Thus, if the user selected to expand tab group 112C, the associated tabs may populate to the right of the tab group 112C in the tab strip 108.

In general, the UI 100 may include any number of browser tabs 110 and tab groups 112 accessed and/or otherwise populated by the browser application 102 responsive to input received by a user during a user session. For example, the tab group UI 100 may include any number of tab groups 112 within the tab strip 108. In addition, any number of browser tabs 110 may also be populated in tab strip 108. In some implementations, browser tabs 110 may be standalone within tab strip 108. In some implementations, browser tabs 110 may be associated with a particular tab group 112.

In addition, each tab group may include indicators on browser tabs to visually indicate that a particular browser tab is associated with a particular tab group. For example, tab group 112A includes browser tabs 110A, 110B, and 110C, each of which include an underline 116 in the tab strip 108 to indicate that such tabs belong to tab group 112A. Similarly, tab group 112B includes browser tabs 110D and 110E, each of which include an underline 118 in the tab strip 108 to indicate that such tabs belong to tab group 112B. Tab group 112C is collapsed in this example and thus does not include an indicator for associated tabs since the tabs are not visible in the tab strip 108.

In some implementations, the visual indicator (e.g., underlines 116 and 118) may be configured to match or substantially match a color, line width, or other visual feature associated with the associated tab group label. In some implementations, the visual indicators associated with particular tab groups may include icons, lines, shapes, animations, text, and/or graphics, etc.

Although not shown in FIG. 1, any number of ungrouped tabs may be depicted within and surrounding the tab groups within the tab strip 108. Ungrouped tabs may be drag-and-drop added to tab groups. In some implementations, ungrouped tabs may also be selected to be associated with a particular tab group via user input. In response to the user input, the ungrouped tab may be added to the particular tab group. In some implementations, tab groups may be combined with other tab groups in the tab strip 108.

Figure 2A:
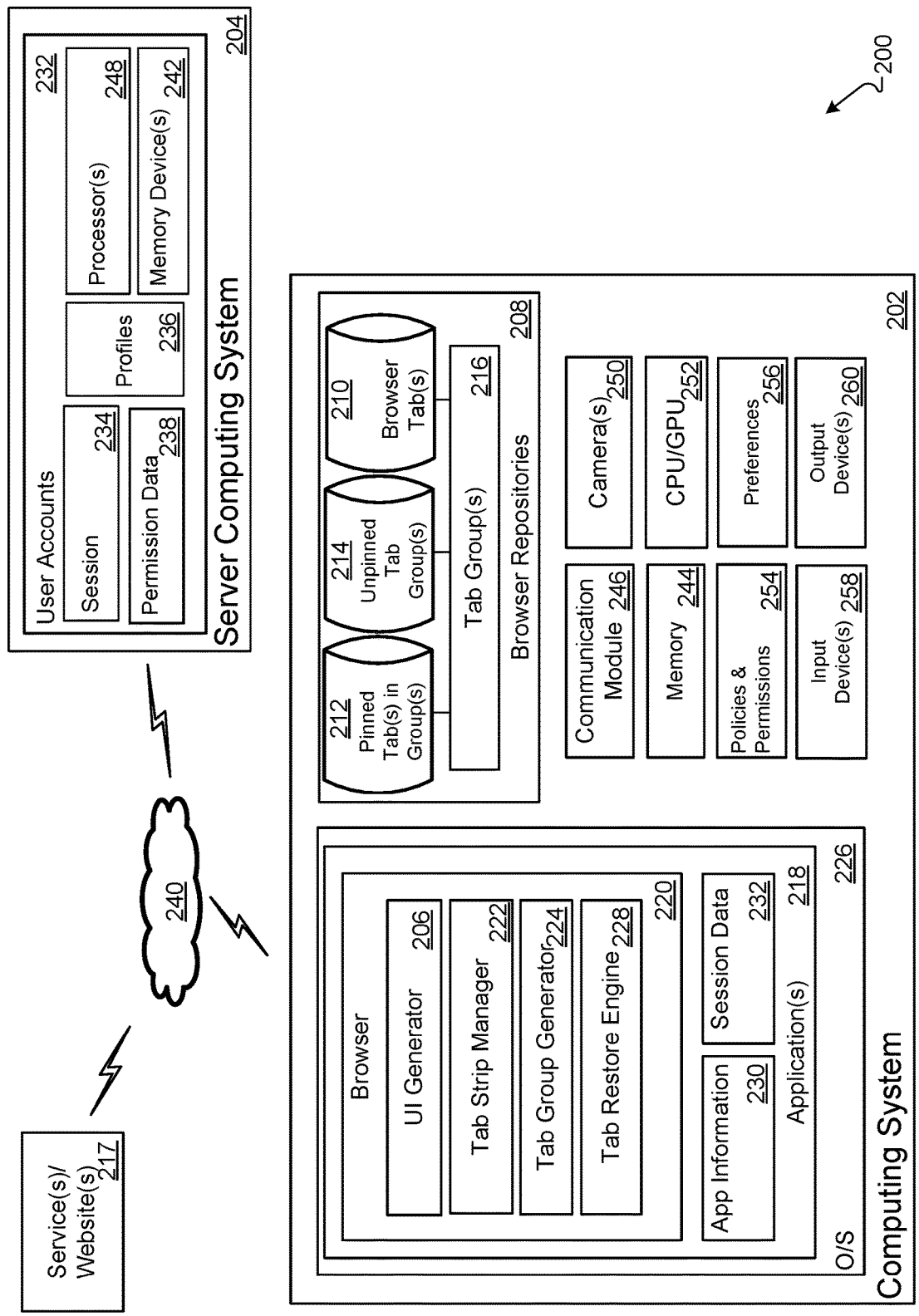
FIGS. 2A-2B are block diagrams illustrating an example computing system configured to generate and populate the tab group UI, in accordance with implementations described herein.

FIG. 2A is a block diagram illustrating an example computing system 200 configured to generate and populate a tab group UI, in accordance with implementations described herein. The system 200 may be used to configure computing devices (e.g., a computing system 202 and a server computing system 204), and/or other devices (not shown in FIG. 2A) to operate the tab group UI 100. For example, system 200 may generate the tab group UI 100 using a UI generator 206 based on data in browser repository 208. For example, the UI generator 206 may generate and trigger for display, browser tabs 210, pinned tab groups 212, and unpinned tab groups 214, and tab groups 216 as well as content retrieved from server computing system 204 and/or services 217 and websites. In some implementations, the browser tabs 210, pinned tab groups 212, and unpinned tab groups 214 may be generated in one or more applications 218, such as browser 220.

The browser tabs 210, pinned tab groups 212, and unpinned tab groups 214 may be modified by a tab strip manager 222 and/or a tab group generator 224. The tab group generator 224 (e.g., a tab group manager) may generate pinned tab groups 212. The pinned tab groups 212 may be configured by a user to remain pinned to a tab strip. For example, the user may select a menu from a tab group in order to indicate that tabs in the tab group should remain pinned when the browser window is closed. Pinned tab groups 212 may be shown in a new browser window when a user chooses to open (or reopen) the browser application 220, for example.

In some implementations, if a browser tab that is not assigned to a tab group is configured as a pinned tab in the tab strip and that browser tab is moved (e.g., drag-and-dropped) into a tab group, the entire tab group may be designated as a pinned tab group. In some implementations, pinning a single tab in a tab group may assign a pinned tab status to each tab of the tab group. In some implementations, a user may choose to remove a browser tab from a tab group in order to remove the pinned tab status. In some implementations, adding a tab to a tab group may cause the added tab to take on the pinned or unpinned status of the tab group. For example, adding an unpinned tab (e.g., associated with unpinned tab group 214) to a pinned tab group may cause the unpinned tab to be changed to a pinned status. In some implementations, grouping tabs and pinning tabs may be mutually exclusive where a tab in a tab group may not be pinned. For example, the tab group may provide another mechanism in which to save a group of tabs such that the pinning status may not affect the tab group.

The tab group generator 224 may be configured to create (e.g., generate) tab groups 270 in response to a user request to generate a tab group with one or more browser tabs 266. In some implementations, the browser 220 may generate tab groups 270 with particular browser tabs 266 based on a learned topic associated with the browser tabs 266. The tab group generator 224 may also be configured to modify a tab group name and/or color.

The tab group generator 224 may also be configured to add tabs to an existing tab group automatically or in response to a user command to do so. The tab group generator 224 may also be configured to reorder tabs in a tab group in response to detecting a user input (e.g., a drag command) to reorder the tabs. The tab group generator 224 may also be configured to drag ungrouped tabs into a tab group in response to detecting a user input (e.g., command) to do so. The tab group generator 224 may also be configured to drag a grouped tab out of a tab group in response to detecting a user input (e.g., command) to do so. The tab group generator 224 may also be configured to close all tabs in a tab group, pin tab groups to a tab strip, and restore tab groups to the tab strip in response to (e.g., upon) detecting closure of the browser and reopening of the browser.

The tab group generator 224 may also be configured to receive input that multi-selects tabs with a mixed tab group status and drag such tabs into or out of particular tab groups. In some implementations, the tab group generator 224 may be configured to detect a command to drag an entire tab group in the tab strip or into a new browser window in response to detect a select and drag command on a name (e.g., tab group header portion).

As shown in FIG. 2A, the computing system 202 includes an operating system (O/S) 226. The O/S 226 may execute and or otherwise manage applications 218, UI generator 206, tab strip manager 222, tab group generator 224, and tab restore engine 228. The O/S 226 may function to execute and/or control applications 218, UI interactions, accessed services, and/or device communications that are not depicted in FIG. 2A.

The tab strip manager 222 may be used to manage the look and feel of elements displayed in the tab groups. The tab strip manager 22 may maintain an order and the contents of each browser tab. The tab strip manager 22 may enable tab groups to be included in a saved state to ensure that closing a browser or browser tab does not disable or delete previously generated tab groups. To support tab groups, the tab strip manager 222 may track changes to tab group metadata (i.e., tab group creation, deletion, or appearance updates). The tab strip manager 222 may also track group membership (i.e., a browser tab being grouped or ungrouped).

The tab group generator 224 may also enable ways tab groups may be modified. For example, the tab group generator 224 may also configure and control tab contexts menus, may allow generation of new tabs, and may oversee drag and drop operations for tabs within the tab strip (in cooperation with the tab strip manager 222) and to new browser windows.

The tab group generator 224 may be called to assess and trigger browser behavior when a new browser tab is opened. For example, when a new browser tab is generated (e.g., opened), the tab group generator 224 may determine whether or not to add the new tab to a tab group. For example, if a final (last opened) tab in a tab strip belongs to a tab group and a new tab is inserted at the end of the tab strip, the tab group generator 224 may add the tab to an existing tab group if the user opened the new tab from a tab group menu. However, if the user instead selected to open a new tab via the browser tab strip or the browser application menu, then the new tab may not be associated with the tab group.

The session data 232 represents the open browser tabs and browser windows during a single login to an operating system. Sessions may be saved and reopened after closing or rebooting the computing device executing the browser application. Tab groups may be saved as session data 232. For example, the browser 220 may store a tab group name and associated assigned color palette. The browser 220 may associate such details for one or more tab groups with the browser session. In addition, the session data 232 may include a tab group affiliation (or lack thereof) for each tab in a tab strip of the browser 220.

In some implementations, users may save tab groups for later retrieval. Users may do so by pinning a tab group to the tab strip and enabling the last opened tabs to reopen in response to (e.g., upon) relaunch of the browser. In some implementations, tab groups may be saved via menu by storing explicit tab groups and each browser tab associated with the tab group in a hierarchical tree, as described below in FIG. 4.

The tab restore engine 228 may be used to restore tabs and tab groups if the user closes multiple tabs at once (for example, via "close tabs to right" context menu command, or multi-selecting tabs and then pressing Ctrl-W). When restoring a session, the browser 220 may retrieve the session data 232 from a previous session to generate restored tabs and tab groups. In general, restoring closed tabs e.g., via shortcut Ctrl-Shift-T may also restore a tab group affiliation. If an entire tab group is closed at once (via a "close group" context menu option, for example) the entire group may be restored simultaneously.

The applications 218 may be any type of computer program that can be executed/delivered by the computing system 202 (or server computing system 204 or via an external service or website 217). Applications 218 may provide a user interface (e.g., a browser application window) to allow a user to interact with the functionalities of a respective application 218. The application window of a particular application 218 may display application data along with any type of controls such as menu(s), icons, widgets, etc.

The applications 218 may include or have access to app information 230 and session data 232, both of which may be used to generate content and/or data and provide such content and/or data to a user and/or the O/S 226 via a device interface. The app information 230 may correspond with information being executed or otherwise accessed by a particular application 218. For example, the app information 230 may include text, images, control signals associated with input, output, or interaction with the application 218. In some implementations, the app information 230 may include data from browser tabs 210, pinned tab groups 212, and/or unpinned tab groups 214. In some implementations, the app information 230 may include data associated with a particular application 218 including, but not limited to metadata, tags, timestamp data, URL data, tab group assignment data, and the like. In some implementations, the applications 218 may include the web browser 220. The browser 220 may be utilized by UI generator 206 to configure tab groups 212/214 and any number of browser tabs 210 for presentation in UI 100.

The session data 232 may pertain to a user session 234 with an application 218. For example, a user may access a user account 232 via a user profile 236 on or associated with the computing system 202, and/or via server computing system 204. Accessing the user account 232 may include providing a username/password or other type of authentication credential and/or permission data 238. A login screen may be displayed to permit the user to supply the user credentials, which, when authenticated, allows the user to access the functionalities of the computing system 202. The session may start in response to the user account 232 being determined as accessed or when one or more user interfaces (UIs) of the computing system 202 are displayed. In some implementations, a session 234 and a user account 232 may be authenticated and accessed using computing system 202 without communicating with server computing system 204. In some implementations, a user session 234 and/or user account 232 is not used to access applications 218.

In some implementations, the user profiles 236 may include multiple profiles for a single user. For example, a user may have a business user profile and a personal user profile. Both profiles may utilize the same tab group UI 100 in order to organize browser tabs from both user profiles. Thus, if a user has a browser session open with a professional profile and a browser session open with a personal user profile, the tab group UI 100 may be used to store and organize browser tabs from both profiles. For example, the system 200 may provide the user a view of a tab strip including the tab group UI 100 where browser tabs rendered in the UI 100 are retrieved from the two user profiles associated with a user with access to the UI 100.

In some examples, the session data 234 is transmitted, over a network 240, to the server computing system in which the data may be stored in memory 242 in association with the user account 232 according to user permission data 238 configured by the user. For example, as the user launches and/or manipulates a session item on the user interface of the computing system 202, session data about the session items may be transmitted to the server computing system 204. In some implementations, session data 234 is instead (or also) stored within a memory device 244 on computing system 202.

In general, the UI generator 206 may function to generate the UI 100 as a quick-access UI element in a tab strip that functions as an organizable holding space for browser tabs. The tab group UI 100 may enable a user to quickly group and access browser tabs. The UI generator 206 may generate tab group representations and visual indicators associated with one or more tab groups, any of which may be rendered in a tab group UI (e.g., multitask UI 100). The UI generator 206 may perform searches, content item analysis, browser process initiation, and other processing activities to tab groups and browser tabs are accurately and efficiently rendered within the tab strip (or another region) of the tab group UI 100. For example, the generator 206 may determine how particular content items (e.g., tab groups, browser tabs, etc.) are depicted in the UI 100 based on user input associated with organizing browser tabs and tab groups in the tab strip. In some implementations, the generator 206 may add formatting to content items. In some implementations, the generator 206 may remove formatting from content items.

In some implementations, animations can occur for any of the UIs (or portions of the UIs) described herein. For example, when transitioning onto the taskbar, the preview region may jump up (e.g., quickly move upward) while scaling (e.g., from small to large, thin to wide, etc.), then may drop down with a single overshoot and then may expand the width of the preview region, based on content items within the region, as the animation causes the review region to come to rest in a final position within the taskbar.

In some implementations, when the preview region transitions onto the taskbar, the region may move upward vertically from an initial resting taskbar location while scaling and then may move downward vertically past the initial resting position and may then move up vertically while expanding horizontally.

As shown in FIG. 2A, the O/S 226 may include or have access to services and/or websites 217, a communication module 246, cameras 250, memory 244, and CPU/GPU 252. The computing system 202 may also include or have access to policies and permissions 254 and preferences 256. In addition, the computing system 202 may also include or have access to input devices 258, and/or output devices 260.

The services 217 may include online storage, website/content access, account session or profile access, permissions data access, and the like. In some implementations, the services 217 may function to replace server computing system 204 where the user information and accounts 232 are accessed via a service. Similarly, the UI 100 may be accessed via services 217.

The computing system 202 may generate and/or distribute particular policies and permissions 254 and preferences 256. The policies and permissions 254 and preferences 256 may be configured by a device manufacturer of computing system 202 and/or by the user accessing system 202. Policies 254 and preferences 256 may include routines (i.e., a set of actions) that trigger based on a selected command, an audio command, a visual command, a schedule-based command, or other configurable command. For example, a user may set up a particular UI to be displayed responsive to a particular action. In response to detecting such an action, system 202 may display the UI 100. Other policies 254 and preferences 256 may of course be configured to modify and or control content associated with system 202 configured with the policies and permissions 254 and/or preferences 256. In some implementations, permissions and policies 254 may be configured for particular applications, browser tabs, browser tab groups, and input related to such entities.

The input devices 258 may provide data to system 202, for example, received via a touch input device that can receive tactile user inputs, a keyboard, a mouse, a hand controller, a mobile device (or other portable electronic device), a microphone that can receive audible user inputs, and the like. The output devices 260 may include, for example, devices that generate content for a display for visual output, a speaker for audio output, and the like.

The server computing system 204 may include any number of computing devices that take the form of a number of different devices, for example a standard server, a group of such servers, or a rack server system. In some examples, the server computing system 204 may be a single system sharing components such as processors 248 and memory 242. User accounts 232 may be associated with system 204 and session 234 configurations and/or profile 236 configurations according to user permission data 238 may be provided to system 202 at the request of a user of the user account 232, for example.

The network 240 may include the Internet and/or other types of data networks, such as a local area network (LAN), a wide area network (WAN), a cellular network, satellite network, or other types of data networks. The network 240 may also include any number of computing devices (e.g., computer, servers, routers, network switches, etc.) that are configured to receive and/or transmit data within network 240. Network 240 may further include any number of hardwired and/or wireless connections.

The server computing system 204 may include one or more processors 248 formed in a substrate, an operating system (not shown) and one or more memory devices 242. The memory devices 242 may represent any kind of (or multiple kinds of) memory (e.g., RAM, flash, cache, disk, tape, etc.). In some examples (not shown), the memory devices 242 may include external storage, e.g., memory physically remote from but accessible by the server computing system 204. The server computing system 204 may include one or more modules or engines representing specially programmed software.

In general, the computing systems 202 and 204 may communicate via communication module 246 and/or transfer data wirelessly via network 240, for example, amongst each other using the systems and techniques described herein. In some implementations, each system 202, 204 may be configured in the system 200 to communicate with other devices associated with system 200.

Figure 2B:
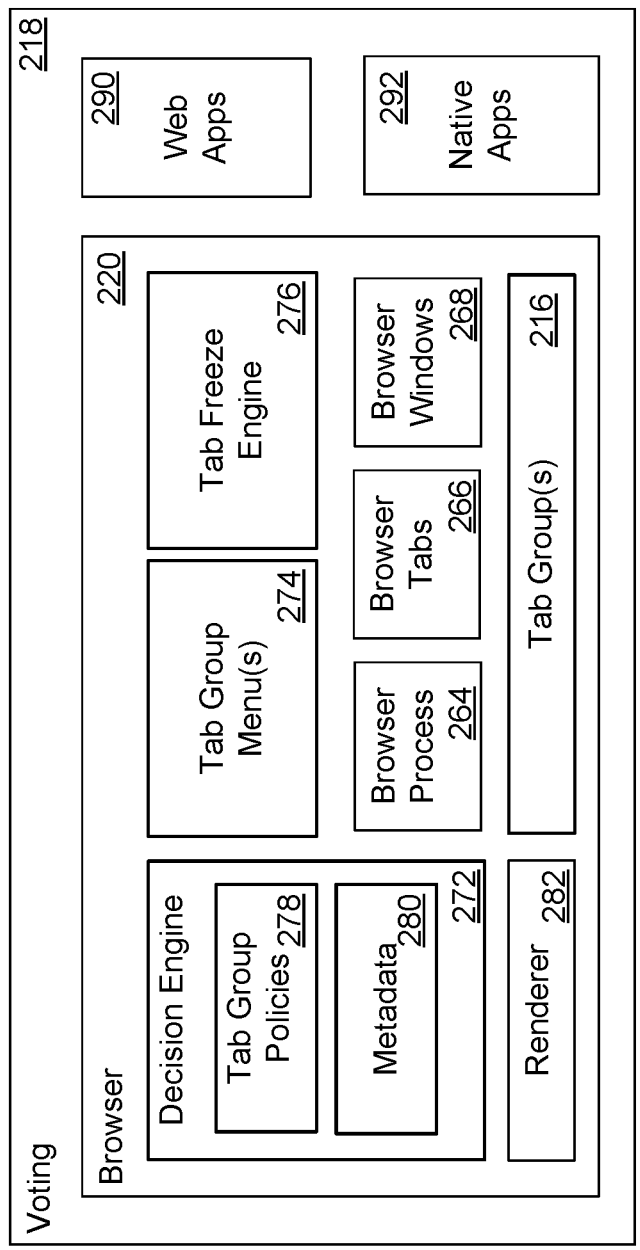

As shown in FIG. 2B, the O/S 226 includes the browser application 220 and additional applications 218. The browser 220 represents a web browser configured to access information on the Internet. The browser 220 may launch one or more browser processes 264 to generate browser content or other browser-based operations. The browser 220 may also launch browser tabs 266 in the context of one or more browser windows 268. The browser may also include tab groups 216 associated with a decision engine 272, tab group menus 274, and tab freeze engine 276.

The decision engine 272 may function as a voting mechanism to determine whether or not to perform operations on browser tabs according to tab group policies 278 and metadata 280, for example. The decision engine may be configured to score browser tabs in tab groups as possible freeze candidates, where freezing may pause actions and/or resources associated with one or more browser tabs. A freeze candidate may represent a browser tab that is indicated to freeze actions and/or resources based on a detected event or heuristic. The events and/or heuristics that may trigger a vote to freeze a browser tab may include any number of assessments about the tab. For example, the decision engine 272 may perform or receive votes associated with assessments about tab behavior, functionality, configurations, or associated tab activities. For example, the decision engine 272 may perform an assessment about tab visibility. If a tab is not visible, a vote may be received by decision engine 272 indicating that the tab may be a freeze candidate. However, if the tab is visible the vote may indicate that the tab is not a freeze candidate.

In another example, the decision engine 272 may perform an assessment of memory resources used by a particular tab. If memory resources are high for the browser tab and the tab is also not in use (e.g., cursor is not focused on the tab and/or the tab is not streaming media), the decision engine 272 (or another browser process) may determine to that the tab is a freeze candidate.

In another example, the decision engine 272 may perform an assessment to determine whether a tab is streaming video and/or audio content. If the tab is streaming such content, the decision engine 272 (or another browser process) may determine that the tab is not a freeze candidate.

In another example, the decision engine 272 may perform an assessment to determine whether a tab is holding a web lock. If the tab is holding a web lock, the decision engine 272 (or another browser process) may determine that the tab is not a freeze candidate based on predetermined rules that indicate not freezing a tab that may be holding a unique resource which may be useful to another non-frozen tab, for example. Similarly, if the tab is holding an indexed database lock, the decision engine 272 may determine that the tab is not a freeze candidate based on similar rationale to the web lock.

In some implementations, the decision engine 272 may perform an assessment to determine if a tab is connected to a particular device. For example, if the tab is connected to (or associated with) a Bluetooth device, a USB device, or other communicably coupled device, the decision engine 272 may determine that such a tab is not a freeze candidate. This may ensure that devices in operation are not disconnected from activities or resources associated with the tab.

In some implementations, the decision engine 272 may perform an assessment to determine if a tab is capturing content (e.g., audio from a microphone application, video from a videoconference tab capturing webcam content, etc.). In some implementations, the decision engine 272 may perform an assessment to determine if a tab is being mirrored (e.g., casting a screen or window), capturing a window (e.g., presenting an application content via videoconference), and/or capturing the entire display. In such examples, the decision engine 272 may determine that such tabs are not freeze candidates because particular activities and/or resources are in use.

Freezing decisions based on particular heuristics, e.g. the collapsed tab group logic may take into account the collapsed state of a tab to cast a freezing vote, but such logic may not check whether or not there is a vote (e.g., heuristic, reason) not to freeze the tab (e.g. if the tab is playing audio). The tab group policies 278 and/or metadata 280 may be configured to ensure that tabs are safe to freeze before carrying out the freeze operation on the tab.

The metadata 280 may include at least a freeze flag decision based on the tab group policies 278 and received votes. The freeze flag decision is for each browser tab and may indicate whether to allow the pausing (e.g., freezing) or starting of the activity associated with the resource. The metadata 280 may also include a browser tab state flag indicating whether the browser tab is in a collapsed state or expanded state. The collapsed state may trigger a vote to freeze (e.g., pause) a browser tab. The metadata 280 may also include connection data associated with the resource. For example, metadata 280 may include data indicating which type of network connection a computing device accessing the browser tab/browser is using. The data may indicate whether the user is wired or wireless, streaming content, a ping rate for downloading content for a tab, whether a tab is actively downloading content, and the like.

The decision engine 272 may provide a voting mechanism to mark browser tabs with votes to freeze actions and/or resources associated with the browser tabs. By default a browser tab may have zero freeze votes, which indicates that the browser tab is not a freeze candidate. The browser process may receive votes based on one or more events occurring in the browser. The votes may function to mark browser tabs as freezable (or not freezable). A tab may be considered as freezable as soon as the tab has at least one positive vote. However, a negative vote can overwrite a positive vote regardless of the quantity of positive votes and thus a negative vote may be used to protect the tab from being frozen. If a frozen tab becomes un-freezable (because of a negative vote or because the last positive vote is removed), then the tab will remain unfrozen.

The tab group menus 274 may include any number of context menus provided in association with each tab group. The tab group menus 274 may be used to modify and interact with the tabs of a tab group and to enable storing, pinning, combining, deleting, or generating tab groups.

The tab freeze engine 276 may provide a way to trigger pause (e.g., freeze) of actions/activities associated with resources used to populate information associated with a particular browser tab in a tab group. For example, the tab freeze engine 276 may use tab group policies 278 to determine which particular browser tabs can be paused from activities that access processing and memory resources of the browser 220, for example. In some implementations, tab group policies 278 may indicate that any browser tab in a collapsed tab group may be paused from accessing resources. In some implementations, the decision engine 272 may be used to determine whether or not particular browser tabs may be paused. For example, if a browser tab is executing and displaying or audibly providing media (e.g., visual content, audio content), then a tab group policy 278 may prevent such a tab from pausing execution. This is because a user may continue viewing or listening to the media even when the browser tab is collapsed within a tab group.

In some implementations, the tab freeze engine 276 may employ policies 278 to pause (e.g., freeze executing code/processes for) a browser tab if the tab is part of a collapsed tab group. In another example, the tab freeze engine 276 may employ policies 278 to pause (or prevent pause of) a browser tab based on a company (e.g., Enterprise) policy. In some implementations, the tab freeze engine 276 may employ policies 278 to pause a browser tab if the tab is a background tab during a session restore when a particular foreground tab is not loaded for execution in the browser. In some implementations, the tab freeze engine 276 may employ policies 278 to pause one or more browser tabs when the computing system 202 is under memory pressure.

The applications 218 may include web applications 290. A web application 290 represents an application program that is stored on a remote server (e.g., a web server) and is delivered over the network 240 through the browser tab 266, for example. In some implementations, the web application 290 is a progressive web application, which can be saved on the device and used offline. The applications 218 may also include non-web applications, which may be programs that are at least partially stored (e.g., stored locally) on the computing system 202. In some examples, non-web applications may be executable by (or running on top of) the O/S 226.

The applications 218 may further include native applications 292. A native application 292 represents a software program that is developed for use on a particular platform or device. In some examples, the native application 292 is a software program that is developed for multiple platforms or devices. In some examples, the native application 292 is a software program developed for use on a mobile platform and also configured to execute on a desktop or laptop computer.

The renderer 282 may render UI content such as browser windows, browser tabs, tab groups, and content associated with such elements. The renderer 282 may function with a display associated with computing system 202, for example, to depict user interface objects or other content to the user of the computing system 202. The renderer 282 may be configured to generate and/or render such objects and content. The renderer 282 may be triggered to render content from UI generator 206, tab strip manager 222, tag group generator 224, tab restore engine 228, browser 220 or associated browser processes, applications 218, and/or other input or output received by the computing system 202.

Figure 3A:
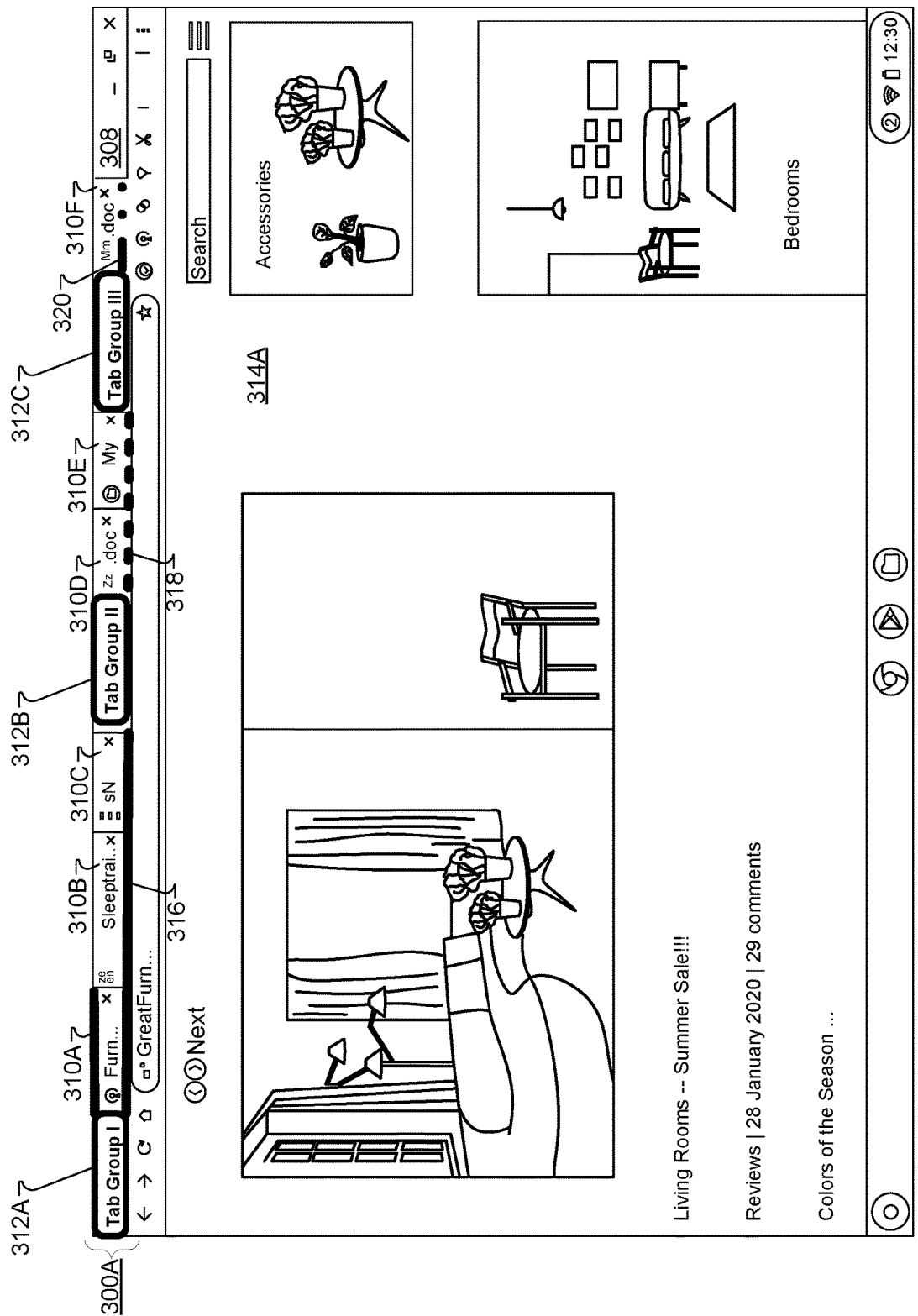
FIG. 3A-3C are screenshots illustrating an example tab group UI executing in a web browser application, in accordance with implementations described herein.

FIG. 3A is a screenshot illustrating an example tab group UI 300A executing in a web browser application, in accordance with implementations described herein. In the example depicted in FIG. 3A, a user may have triggered the browser application 220 to generate, for a browser tab strip 308, a first tab group 312A named "Tab Group I," a second tab group 312B named "Tab Group II," and a third tab group 312C, named "Tab Group III."

Each tab group 312A, 312B, 312C may be configured to include any number of browser tabs. A user may select a number of browser tabs for addition to a particular tab group. For example, a user may select browser tab 310A, browser tab 310B, and browser tab 310C for addition to the first tab group 312A. Similarly, the user may select browser tab 310D and browser tab 310E for addition to the second tab group 312B. In addition, the user may have added a browser tab 310F to tab group 312C.

In general, the UI 300A may include any number of browser tabs and browser groups accessed and/or otherwise populated by the browser application 220 responsive to input received by a user during a user session. For example, the tab group UI 300A may include any number of tab groups within the tab strip 308. In addition, any number of browser tabs may also be populated in tab strip 308. In some implementations, browser tabs may be standalone within tab strip 308. In some implementations, browser tabs may be associated with a particular tab group 312. In the depicted example, no standalone browser tabs are depicted.

Each tab group may include indicators on browser tabs to visually indicate that a particular browser tab is associated with a particular tab group. For example, tab group 312A includes browser tabs 310A, 310B, and 310C, each of which include an underline 316 in the tab strip 308 to indicate that such tabs belong to tab group 312A. Similarly, tab group 312B includes browser tabs 310D and 310E, each of which include an underline 318 in the tab strip 308 to indicate that such tabs belong to tab group 312B. Tab group 312C includes the browser tab 310F which includes an underline 320 to indicate that the tab belongs to tab group 312C.

As used herein, a tab group header portion may represent a portion on the left side of the tab group that includes a tab group title (e.g., a name) and may include access to a tab group menu button. The tab group title (e.g., name) may be a user-selected label for the tab group that appears in the group header portion. The tab group title may be dragged within and outside of the tab strip 308, which may function to drag the entire tab group. In some implementations, the tab group title may utilize enough real estate to show the entire title, and thus each tab group header portion may be a different size than another tab group header portion.

The tab group menu control may represent a UI control that appears in the group header portion that when selected, opens one or more menus, such as a tab group menu. The tab group menu may represent a context menu with group control options. The tab group menu may be summoned either by selecting the group menu control or right-clicking with a mouse on the group header portion, for example.

As used herein, a tab group bounds may be shown as a textured or colored element (e.g., line, icon, shape, etc.) indicating the bounds of the tab group. In the depicted example of FIG. 3A, the tab group bounds are indicated by line 316, line 318, and line 320. The indicated bounds may include an underline that is displayed within the tab strip 308 and underneath each expanded browser tab. For example, browser tabs 310A, 310B, and 310C are expanded and include the line 316 to indicate the tab group bounds of tab group I 312A. In some implementations, an active tab may have an additional border matching the underline to indicate that the user has selected a particular tab to make the tab active and to display the web content, as shown in window 314A.

As used herein, a grouped tab represents a tab associated with a tab group. Each tab associated with a tab group is contiguous with other members of the tab group and is drawn within the group bounds. As used herein, an ungrouped tab represents a tab not associated with a tab group and therefore may function in the tab strip as a conventional browser tab.

Figure 3B:
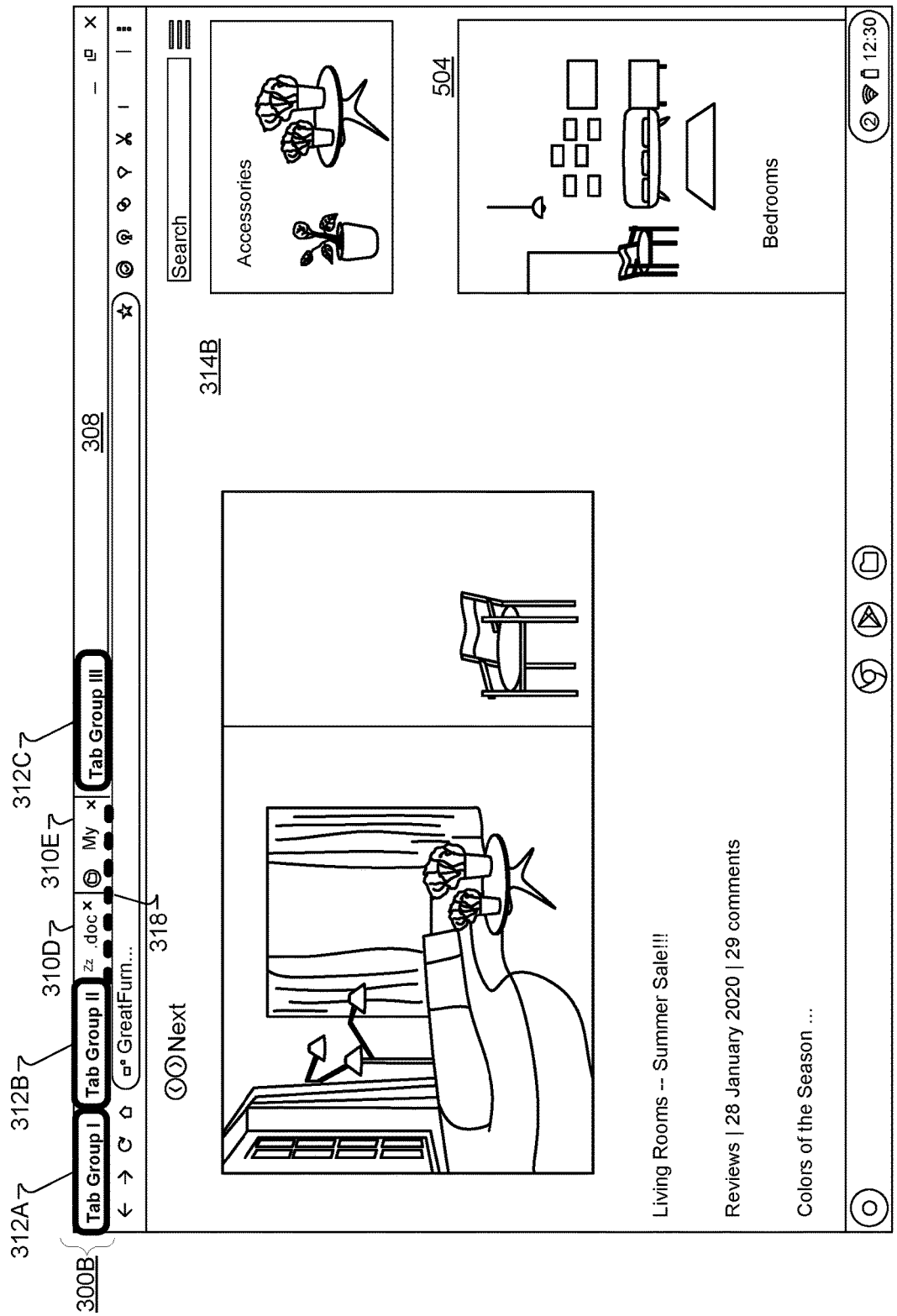

A user interacting with UI 300A may choose to collapse and/or expand tab groups 312A, 312B, and/or 312C. For example, as shown in FIG. 3B, a UI 300B is depicted with the tab group 312A and tab group 312C shown in a collapsed state. The user may have selected a header portion of tab group 312A to condense (e.g., collapse) the tabs (310A, 310B, and 310C from FIG. 3A) into the tab group 312A, as shown in FIG. 3B. Similarly, the user may have selected a header portion of tab group 312C to condense the tab 310F into the tab group 312C.

The tab group 312B remains expanded with browser tabs 310D and 310E expanded in the tab strip 308. The tab group bounds is shown by line 318 (FIG. 3B). Although the user interfaced with tab groups 312A and 312 C, the browser window 314B shown in FIG. 3B depicts the same content as in FIG. 3A. This is because the user did not select another browser tab to change the focus of the content in the window 314B. Thus, interacting with tab groups and related menus or commands may not modify contents depicted in the browser window until a user selects an actual tab in the tab strip 308.

Figure 3C:
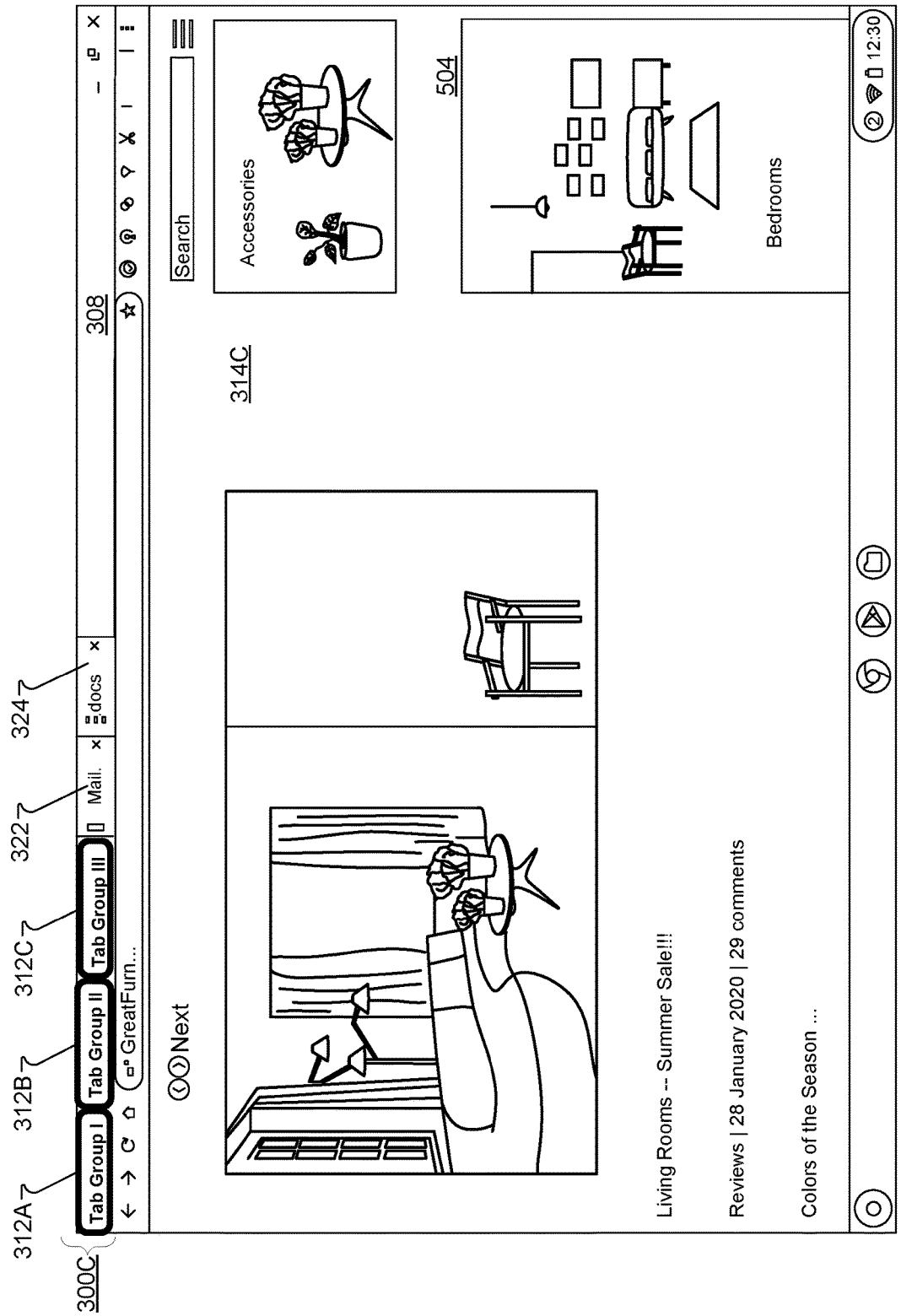

Referring to FIG. 3C, the tab strip 308 is again depicted as a UI 300C. In this example, the tab groups 312A, 312B, and 312C are each in a collapsed state. The collapsed state represents a tab group where the user has explicitly elected to collapse the tab group. This means that the tabs associated with the group may be hidden and made accessible through the tab group header, should the user expand the tab groups at some point in time. In general, the user may not have changed the cursor focus of the browser and thus, the same window content shown in browser window 314A (FIG. 3A) and 314B (FIG. 3B) remains depicted in browser window 314C of FIG. 3C.

In addition to the collapsed tab groups, the UI 300C depicts an ungrouped browser tab 322 indicated as a mail program and an ungrouped browser tab 324 indicated as a document. Here, an ungrouped tab such as tabs 322 and 324 may be standalone browser tabs that are not associated with any of the tab groups. A user may cause a browser tab to be ungrouped by dragging a grouped browser tab out of the tab group and into the tab strip 308.

Alternatively, a user may open a new browser tab without assigning the tab to a tab group and the new browser tab may be considered ungrouped. In addition, ungrouped browser tabs may be associated with a tab group if the user associates the ungrouped browser tabs with the tab group. In some implementations, associating an ungrouped browser tab with a previously generated tab group may include accessing a menu from the browser (via the ungrouped tab, for example) and the user may use the menu to assign the ungrouped browser tab to the previously generated tab group. In some implementations, associating an ungrouped browser tab with a tab group may include assigning the ungrouped tab to a new tab group. In some implementations, associating an ungrouped browser tab with a previously generated tab group may include dragging the ungrouped tab into a portion of a browser tab that is associated with the previously generated tab group. For example, overlapping ungrouped browser tabs with grouped browser tabs may function to assign the tab group to the ungrouped browser tabs, thus associating the ungrouped tabs with the tab group.

Figure 4:
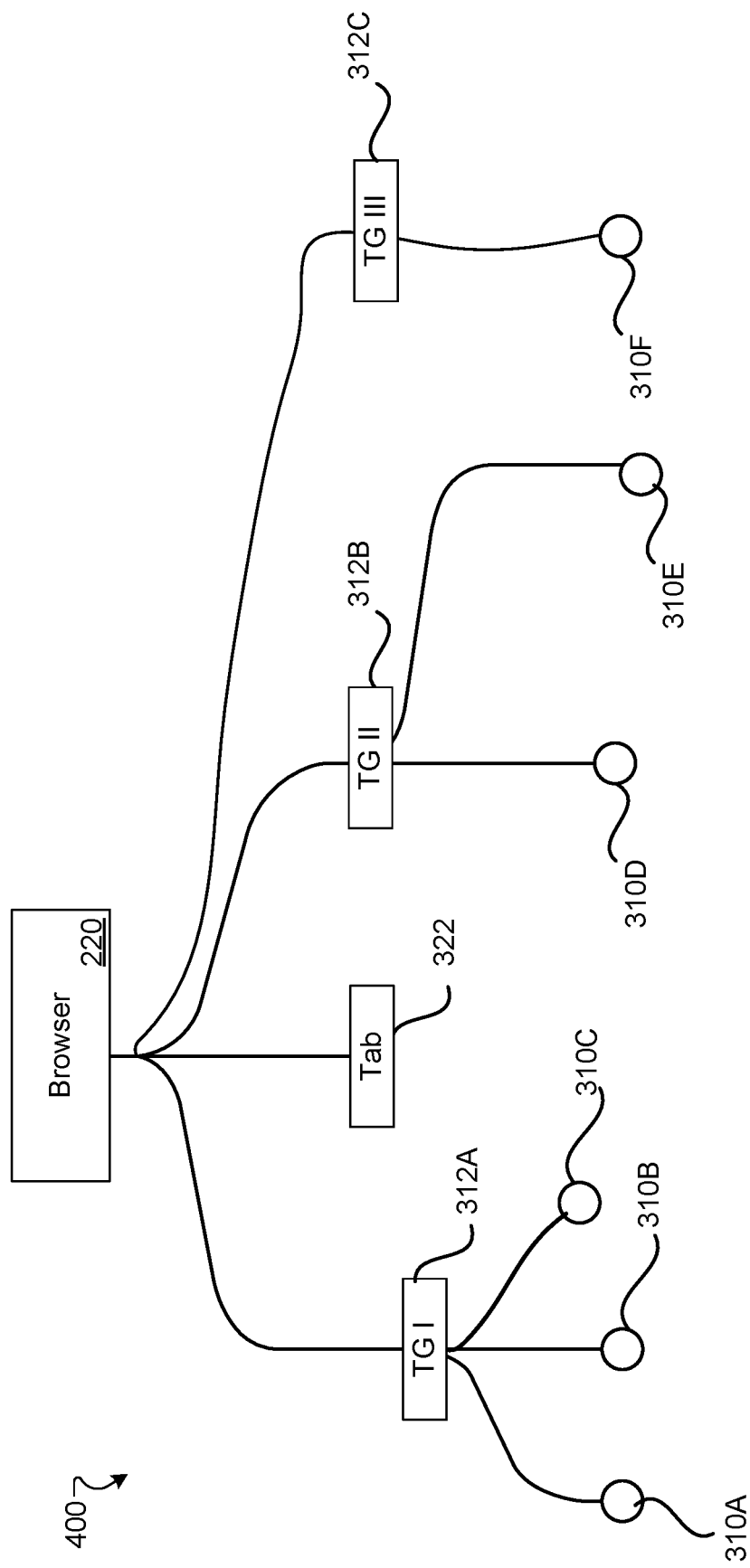
FIG. 4 is a hierarchical tree for example tab groups configured for the web browser application, in accordance with implementations described herein.

FIG. 4 is a hierarchical tree 400 for example tab groups configured for the web browser application, in accordance with implementations described herein. In some implementations, the hierarchical tree 400 for the browser 220 including all open tabs. The hierarchical tree 400 is an example tree for the browser tabs and tab groups of FIGS. 3A-3C. As shown, the browser 220 includes the nodes for each of tab groups 312A, 312B, and 312C in addition to a node for ungrouped browser tab 322. The tab group 312A includes browser tabs 310A, 310B, and 310C. The tab group 312B includes browser tabs 310D and 310E. The tab group 312C includes a browser tab 310F. The hierarchical tree 400 may be modified each time a tab is removed or added to a tab group, each time a new browser tab is opened, each time browser tab groups are merged or split, and when a tab group is closed or removed.

Figure 5A:
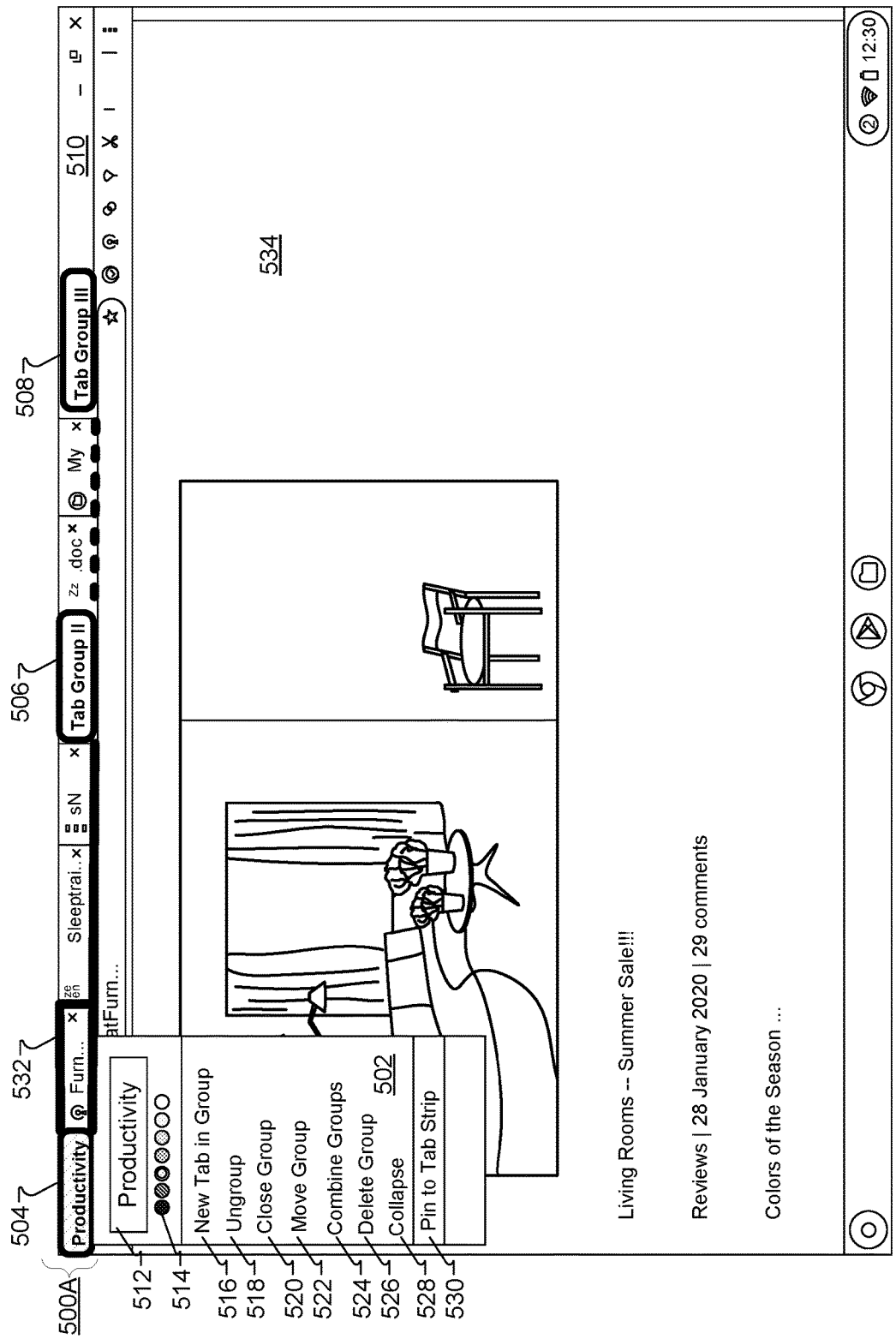
FIGS. 5A-5C are screenshots illustrating example menus associated with a tab group UI, in accordance with implementations described herein.

FIG. 5A is a screenshot illustrating an example menu 502 associated with a tab group UI 500A, in accordance with implementations described herein. The menu 502 may be triggered from any of tab group 504, tab group 506, or tab group 508, or another tab group (not shown) associated with tab strip 510. In the depicted example, the menu 502 may have been triggered to be rendered based on user input on the tab group 504. For example, a user may right click on the tab group 504 to trigger the browser 220 to render menu 502. In addition, the user may have named the tab group 504 as 'Productivity' using control 512. In addition, the user may have selected a shading or color for the tab group using control 514. If the user generated the tab group for the first time, the user may fill in the tab group name (e.g., identifier) using control 512. The control 512 may also be used to modify the tab group name at any point during a browser session.

The menu 502 includes a number of selectable options to perform commands and/or functions on the tab group 504, for example. As shown, the menu 502 includes a new tab in group command 516, an ungroup command 518, a close group command 520, a move group command 522, a combine groups command 524, a delete group command 526, a collapse group command 528, and a pin/unpin to tab strip command 530. Each command in the menu 502 may be selected, touched, or accessed via keyboard shortcut. Here, the cursor focus is on browser tab 532, which triggers presentation of content, as shown in browser window 534. In addition, the user has chosen to interact with menu 502 by selecting a portion of tab group 504.

The new tab in group command 516 enables a user to add additional tabs from tab strip 510 to a particular tab group or add a newly opened browser tab to the particular tab group. The ungroup command 518 may be selected by a user to ungroup one or more tabs from a tab group. The close group command 520 may be selected by a user to close one or more tab groups. The move group command 522 may be selected by a user to move and/or reorganize an order of tab groups in the tab strip 510.

Alternatively, a user may drag-and-drop tab groups within tab strip 510 or drag one or more tab groups to a new window. The combine groups command 524 may be selected by a user to combine two or more tab groups together. Subsequent renaming of the group may be offered when combining tab groups. In some implementations, a user may combine tab groups by performing a drag-and-drop input to join (e.g., combine) one or more tab groups. The delete group command 526 may be selected by a user to delete one or more tab groups. The collapse group command 528 may be used to collapse a particular tab group or alternatively may be used to collapse all tab groups. The pin/unpin to tab strip command 530 may be used to pin (or unpin) one or more tab groups to a tab strip 510, for example.

Figure 5B:
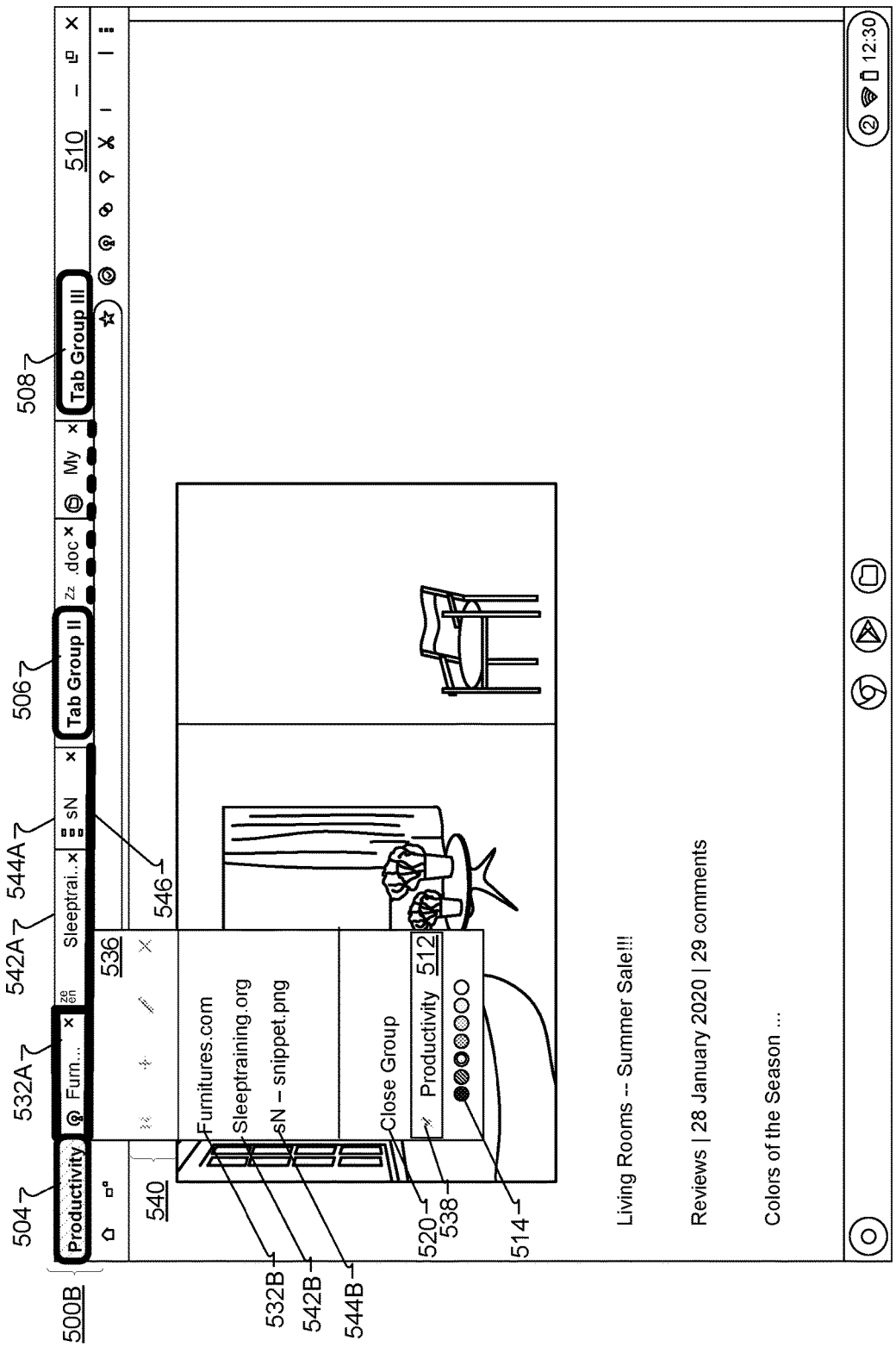

FIG. 5B is a screenshot illustrating another example menu 536 associated with a tab group UI 500B, in accordance with implementations described herein. The menu 536 includes controls 512, 514, and 520 similar to menu 502. In addition, the menu 536 includes a pin indicator 538 indicating that the productivity tab group 504 is pinned to the tab strip 510. The user may also be provided controls 540 to move within tab groups within the tab strip 510 in order to operate on the various tab groups using menu 536. For example, the tab group 504 is the focus of menu 536 shown in FIG. 5B. The user may use controls 540 to move between tab groups 504, 506, and 508 in order to perform operations on such groups without leaving the UI of menu 536. For example, the user may add browser tabs to tab groups using controls 540. In addition, the user may edit browser tabs within tab group 504 and/or close browser tabs within tag group 504 using controls 540.

The menu 536 also lists the open and grouped browser tabs associated with a particular tab group being accessed via menu 536. For example, browser tabs 532A, 542A, and 544A are depicted in the tab strip 510 and are included as part of tab group 504. Menu 536 also lists the browser tabs associated with tab group 504, as shown by URL 532B, URL 542B, and URL 544B. The user may select any or all of the URLs 532B, 542B, or 544B to modify or delete a browser tab from tab group 504 using menu 536.

In some implementations, additional shortcuts and/or context menu commands may be included in menu 502 and/or menu 536. For example, a tab right-click context menu may include adding a new group to a tab. In some implementations, the context menu may list any and all available tabs to provide an option of adding a tab to an existing group. In some implementations, opening a new tab in a tabs strip may be performed via right click to view a context menu. That context menu may provide options to open the new tab in a new group and may also provide options to open the new tab in a particular previously configured tab group. Keyboard shortcuts may also be provided for any and all context menu commands. Example keyboard shortcuts may also include any or all of generating new tabs for tab groups, generating new tab groups, duplicating tabs or tab groups, and recreating tab groups that were closed, etc.

Figure 5C:
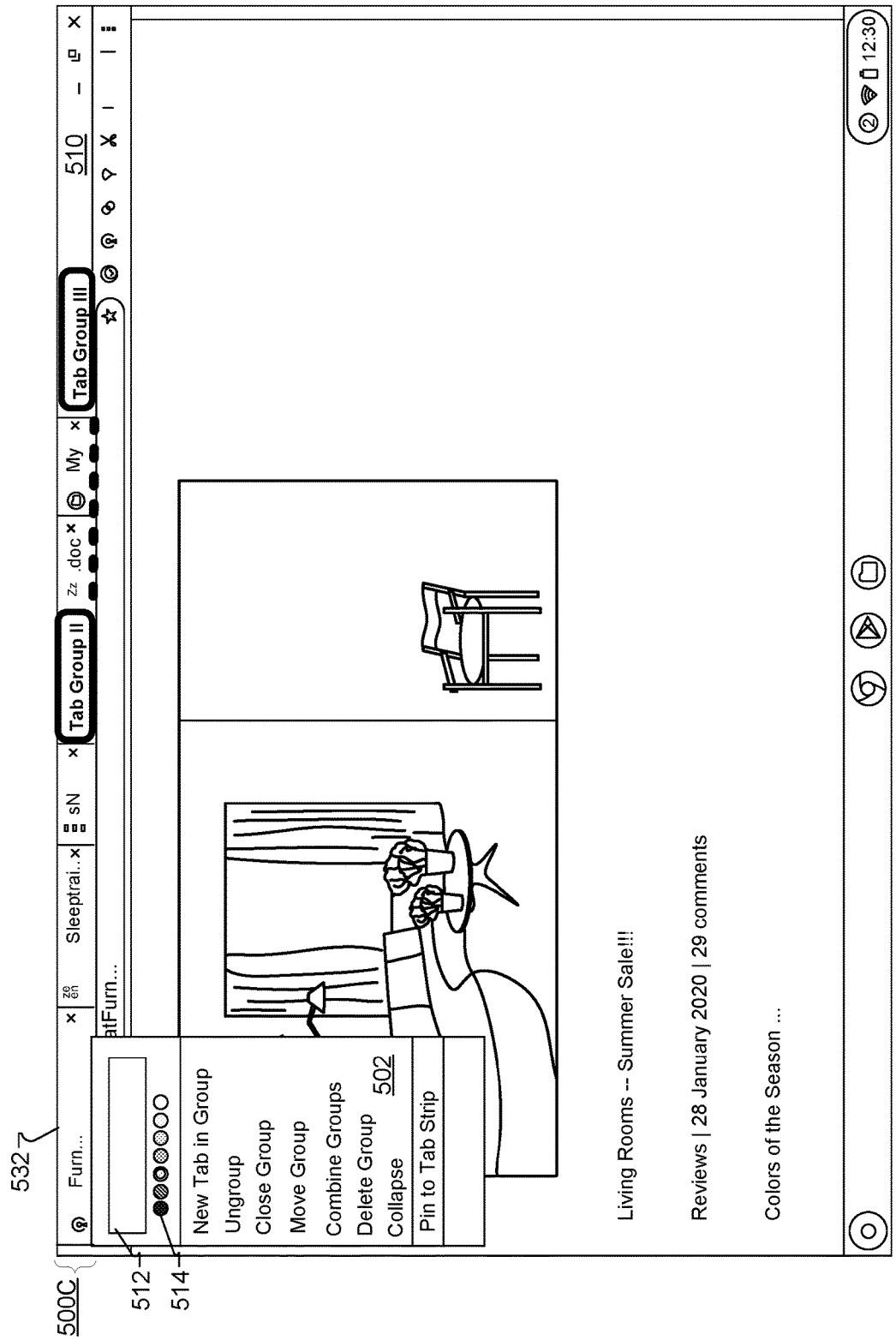

FIG. 5C is a screenshot illustrating an example menu 502 associated with a tab group UI 500C, in accordance with implementations described herein. The menu 502 may be triggered from a browser tab in order to create a tab group. For example, a user may assess menu 502 via keyboard shortcut, mouse click, touch input, etc. and may be requested to enter a name (e.g., identifier) for a new tab group in which to add browser tab 532. In some implementations, menu 536 may be presented to add more than one browser tab at a time when generating a new tab group.

In some implementations, to generate a new tab group, a user may right click on the browser tab 532 to trigger the browser 220 to render menu 502. The user may utilize the control 512 and/or control 514 to name and identify the new tab group. Since this is a new tab group, the user is generating the tab group for the first time and as such the user may fill in the tab group name (e.g., identifier) using control 512. The control 512 may also be used to modify the tab group name at any point during a browser session.

Figure 6A:
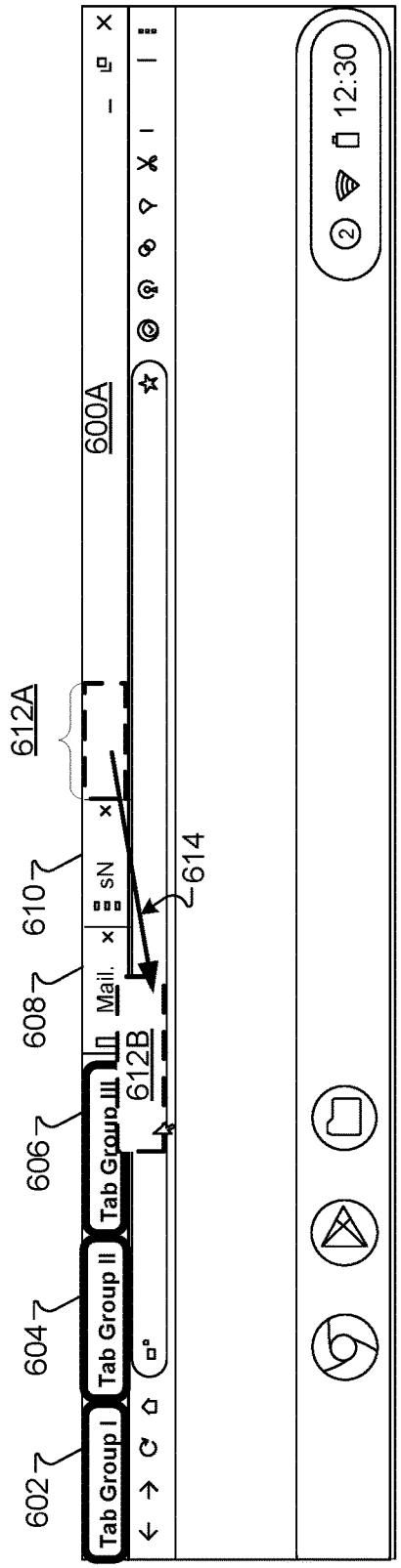
FIGS. 6A-6B are screenshots illustrating an example of dragging a browser tab into a tab group, in accordance with implementations described herein.
Figure 6B:
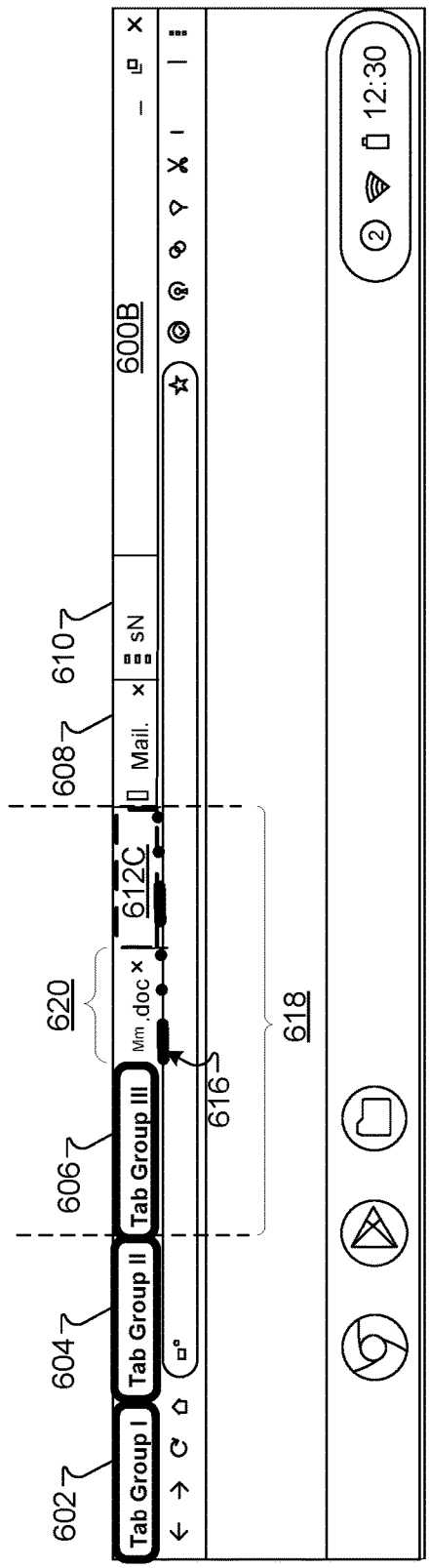

FIGS. 6A-6B are screenshots illustrating an example of dragging a browser tab into a tab group, in accordance with implementations described herein. FIG. 6A illustrates a tab strip 600A with a first tab group 602, a second tab group 604, and a third tab group 606. Each tab group 602-606 are collapsed and thus no browser tabs are depicted as being associated with any of the tab groups in the tab strip 600A. A browser tab 608 and a browser tab 610 are depicted in the tab strip 600A, but are not indicated as being associated with any of the tab groups 602-606. In addition, a new browser tab 612A is depicted in the tab strip 600A.

A user may add one or more tabs to a tab group 602-606. To do so, the user may select (e.g., click, touch input, or other input), for example, a browser tab, such as tab 612A, and may drag tab 612A onto a portion of a tab group name (e.g., identifier), as indicated by arrow 614. Here, the tab 612A is dragged to overlap a tag group name of tab group 606, as shown by item 612B. In response to (e.g., upon) dragging, the user may release the selection (e.g., lift a mouse button, release a keyboard shortcut, or lift a touch input) to trigger adding the tab 612A to tab group 606, as shown by tab 612C in FIG. 6B in tab strip 600B.

FIG. 6B depicts an updated screenshot from FIG. 6A where the new browser tab 612A has been successfully added to tab group 606. The tab group 606 may expand to depict the browser tabs associated with the group 606, as well as the newly added tab 612C. The tab group 606 also depicts an indicator line 616 under each tab associated with the tab group 606. Here, tab group 606 encompasses content 618, which includes new tab 612C and browser tab 620. The previously ungrouped tabs 608 and 610 remain outside of the tab groups 602-606 and have been shifted to make room for the new tab 612C and expanded tab group 606.

Figure 7A:
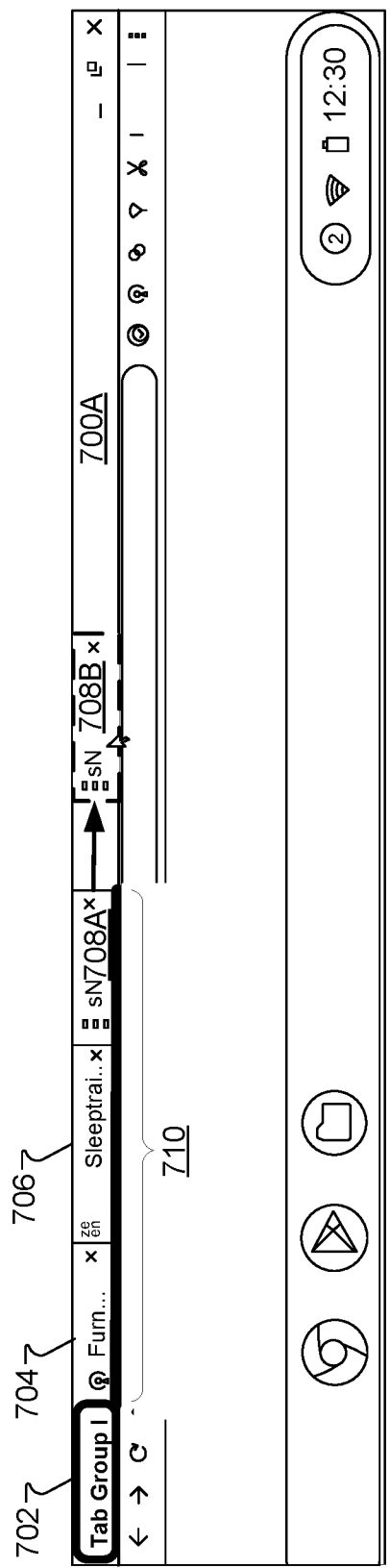
FIGS. 7A-7B are screenshots illustrating an example of dragging a tab out of a tab group, in accordance with implementations described herein.
Figure 7B:
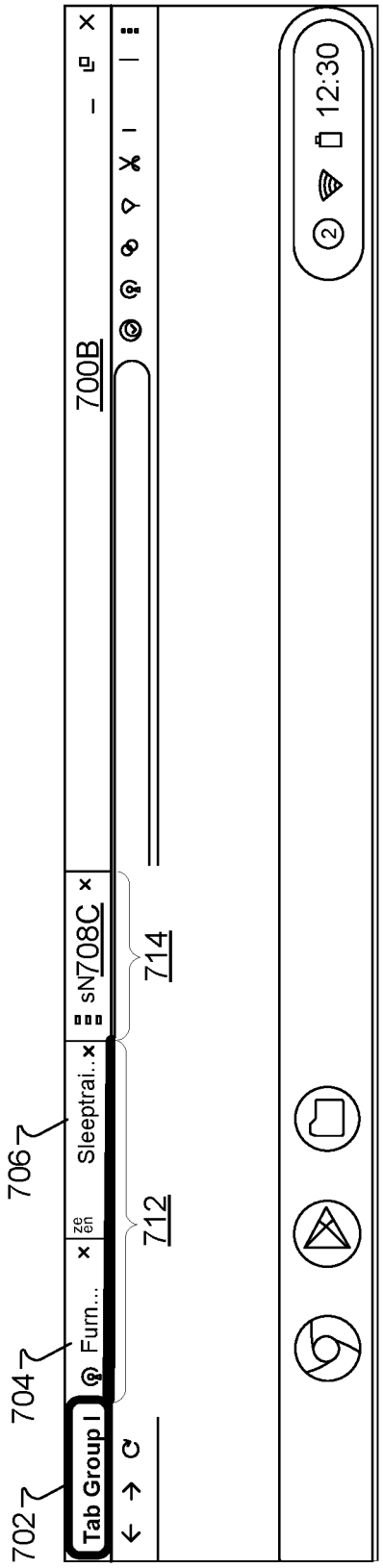

FIGS. 7A-7B are screenshots illustrating an example of dragging a tab out of a tab group, in accordance with implementations described herein. FIG. 7A illustrates a tab strip 700A with a first tab group 702. Although a single tab group is depicted in the examples of FIGS. 7A-7B, any number of browser tabs and tab groups may be populated in tab strip 700A/700B. The tab group 702 is associated with a first browser tab 704, a second browser tab 706, and a third browser tab 708 (e.g., tab 708A indicating a first location for tab 708). A line 710 functions as an indication that the tabs 704-708 are associated with the tab group 702. At some point, a user may remove a tab from the tab group 702. The user may delete the tab from the tab group by closing the tab or accessing a menu to remove the tab or close the tab, such as the menus shown in FIGS. 5A-5C.

In some implementations, the user may retain a browser tab in the tab strip 700A, but may want the tab removed from a particular tab group. To do so, the user may select a browser tab (e.g., browser tab 708A) and drag the tab out of the tab group 702 within the tab strip 700A. Moving the browser tab 708A beyond the line 710 indicating the tab group 702 contents can break the association of browser tab 708 with tab group 702. For example, tab 708A is shown dragged rightward in tab strip 700A, as indicated by tab 708B, which represents a second location of browser tab 708).

FIG. 7B is a screenshot depicting the browser tab 708 removed from the tab group 702. For example, the user performed a select and drag movement on tab 708, shown by tabs 708A and 708B of FIG. 7A. In response, the browser depicting tab strip 700A may update the UI, as shown in tab strip 700B of FIG. 7B. The updated UI includes the browser tab 708 removed from tab group 702, as indicated by tab 708C (representing a third location of browser tab 708). The tab strip 700B also updated the line 710, by shortening the line, as shown by line 712. The line 710 is removed (shown by a lack of an indicator at 714) from underneath tab 708C to visually indicate to the user that tab 708 (e.g., tab 708C in FIG. 7B) is no longer associated with tab group 702.

Figure 8A:
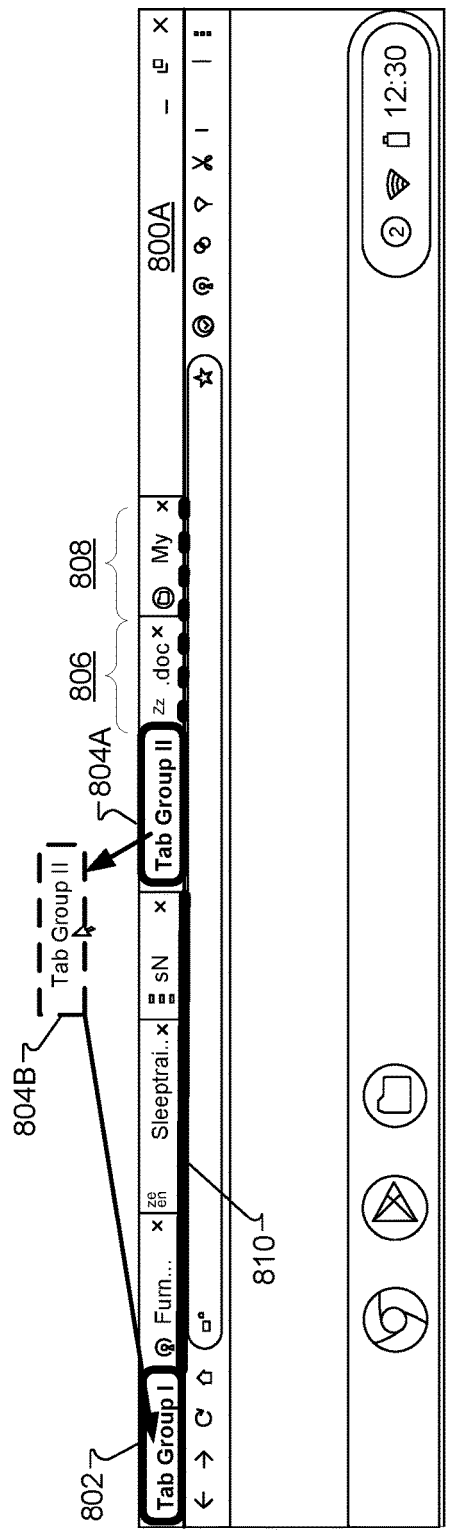
FIGS. 8A-8B are screenshots illustrating an example of dragging a tab group into another tab group, in accordance with implementations described herein.
Figure 8B:
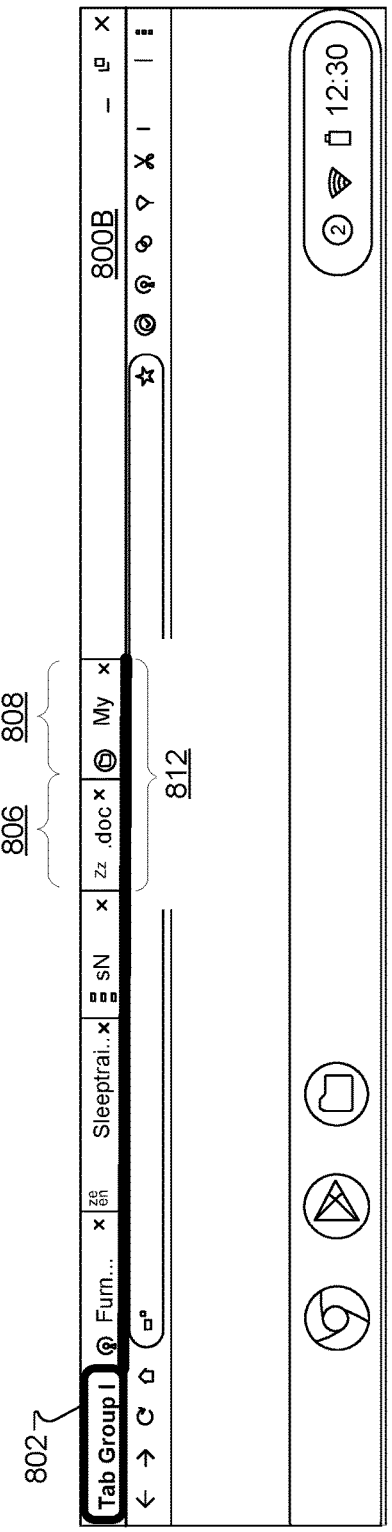

FIGS. 8A-8B are screenshots illustrating an example of dragging a tab group into another tab group, in accordance with implementations described herein. FIG. 8A depicts a tab strip 800A that includes a first tab group 802 and a second tab group 804 (shown as tab group 804A representing a first location of tab group 804). Each tab group includes a number of browser tabs. For example, the second tab group 804 includes a first browser tab 806 and a second browser tab 808. At some point in time, a user may combine one or more tab groups. To do so, the user may select a tab group to combine with another tab group. For example, if the user combined the second tab group 804 with the first tab group 802, the user may select tab group 804 (i.e., tab group 804A) and drag the tab group 804A within the tab strip 800A and onto a portion of the name of tab group 802. In some implementations, the user may drag the tag group 804A outside of the tab strip 800A, as shown by tab group 804B and then continue to drag tab group 804B over onto a portion of the name of tab group 802. A release of the drag (i.e., a drop) detection may trigger combining of the tab group 804 into tab group 802, as shown in FIG. 8B. Alternatively, tab groups may be joined using menus, as shown in FIGS. 5A-5C.

FIG. 8B is a screenshot depicting the tab group 804 merged with tab group 802. In this example, the tab group indicator (e.g., header, name) has been removed and each browser tab (e.g., tabs 806 and 808) have been associated with the first tab group 802. To visually indicate the added tabs 806 and 808, the line 810 from FIG. 8A is now shown with an extended portion 812 to include the newly associated browser tabs 806 and 808.

In some implementations, the browser 220 may initiate a drag in response to a user select and drag on a header portion (e.g., name) of a tab group. When the select and drag is performed, the browser 220 triggers selection of the entire tab group and in response to release of the selection, the browser 220 drops the selected tab group in a location associated with the release of the selection. In some implementations, the location is within a tab strip. In some implementations, the location is associated with a new browser window if the release of the selection occurs outside of the tab strip. For example, a tab group that is dragged out of the tab strip may generate a new browser window depicting the dragged tab group and any associated browser tabs.

Figure 9:
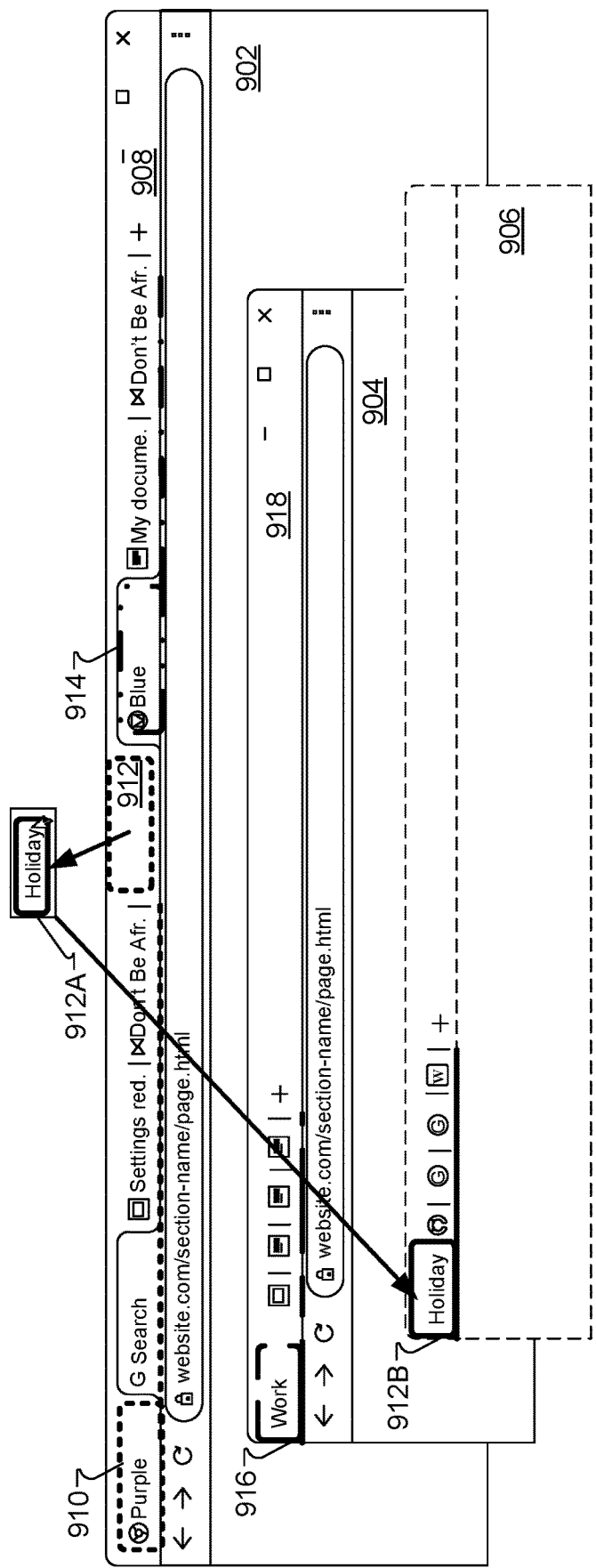
FIG. 9 is a screenshot depicting an example of dragging a tab group from a first browser window to a second browser window, in accordance with implementations described herein.

FIG. 9 is a screenshot depicting an example of dragging a tab group from a first browser window to a second browser window, in accordance with implementations described herein. Here, a first browser window 902, a second browser window 904, and a third browser window 906 are shown. The browser window 902 includes a tab strip 908, which includes a first tab group 910, a second tab group 912, and a third tab group 914. Various browser tabs are shown and are associated with respective tab groups. At some point, a user may have selected a tab group to drag out of window 902. For example, the user may have selected a fourth tab group 916 from tab strip 908 and dragged the tab group 916 out of the tab strip 908 and released the drag command to trigger generation of a new browser window 904 that includes the tab group 914 within a new tab strip 918. The third browser window 906 may be generated in a similar fashion. For example, a user may select tab group 912 in tab strip 908 and may drag the selected tab group 912 upward or downward out of the tab strip 908, as indicated by tab strip 912A, which represents a second location of tab group 912. The tab group 912 when selected and dragged is generally collapsed. If the tab group 912 were not in a collapsed state before the select and drag motion, the browser 220 may automatically collapse the browser tabs of the tab group 912 in response to receiving the select and drag. The user may then drag the tab group 912 to a new location to generate the tab group 912 (shown by 912B representing a third location for tab group 912) in a new browser window (e.g., window 906). The window 906 may be generated in response to release of the browser tab group 912, as shown by the tab group at tab group 912B.

Figure 10A:
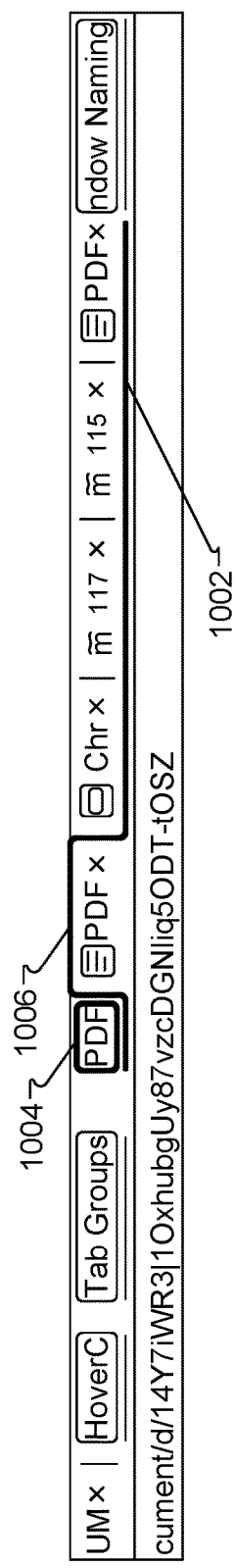
FIGS. 10A-10C are screenshots illustrating examples of tab group indicators, in accordance with implementations described herein.
Figure 10B:
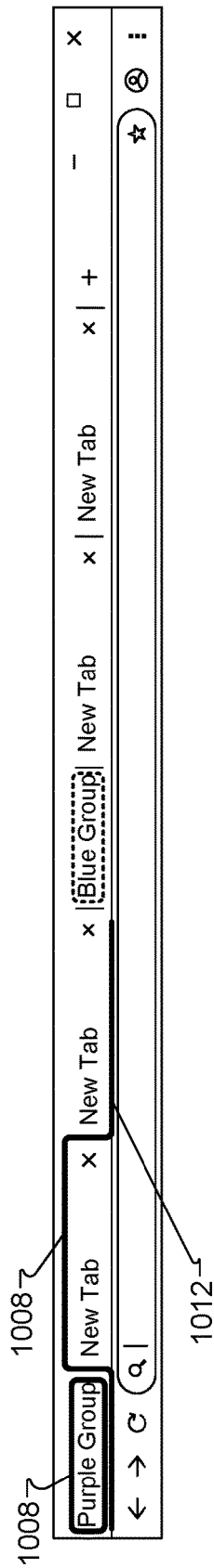
Figure 10C:
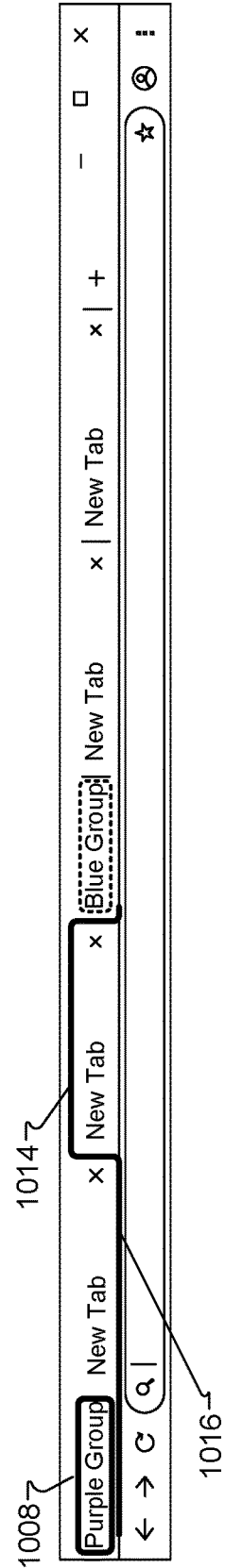

FIGS. 10A-10C are screenshots illustrating examples of tab group indicators, in accordance with implementations described herein. FIG. 10A includes a tab indicator line 1002 that indicates association with a tab group 1004 while also indicating the active tab 1006 in the tab group 1004. FIG. 10B includes a tab group 1008 with an active tab indicated by an indicator line 1012. FIG. 10C includes the tab group 1008 with a change in the active tab 1014, as shown by indicator line 1016.

Figure 11:
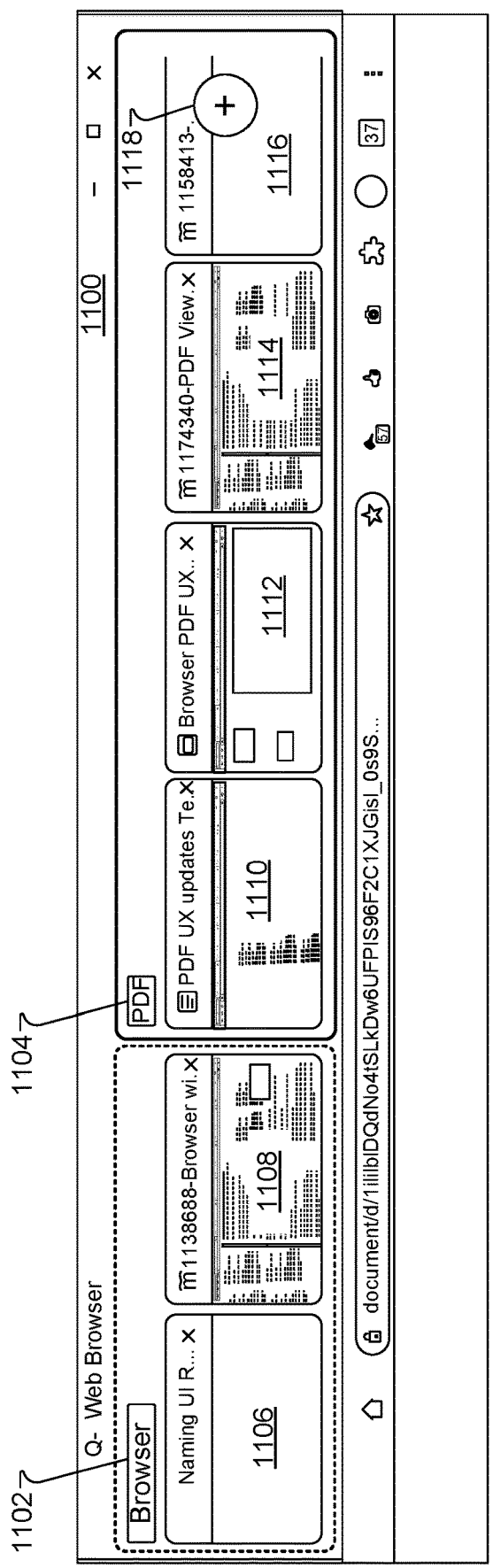
FIG. 11 is a screenshot depicting an example touch input implementation of tab groups for a mobile device, in accordance with implementations described herein.

FIG. 11 is a screenshot depicting an example touch input implementation of tab groups for a mobile device, in accordance with implementations described herein. For example, the mobile device may be a mobile phone, a tablet, a convertible laptop, or another computing device with a touch input displays screen. In some implementations, the touch input variation shown in FIG. 11 may alternatively be used with traditional keyboard, mouse, stylus, or controller input. In addition, the UI elements of FIG. 11 may function in a similar fashion to the UI elements representing tab groups, as described throughout this document.

As shown in FIG. 11, a web browser application tab strip 1100 includes a first tab group 1102 and a second tab group 1104. Other tab groups may also be included in the tab strip 1100. In addition, the tab strip 1100 may be scrollable to view additional tab groups and/or browser tabs. For example, a user may scroll left to right and up and down within the tab strip 1100.

Each tab group 1102 and 1104 may be associated with any number of browser tabs representing documents or web pages. In this example, the browser tabs are thumbnail images (e.g., reduced versions) of web pages or documents representing content accessed via the browser 220, for example. Other visual representations of the browser tabs and/or web pages are possible.

The tab group 1102 includes a first selectable icon 1106 and a second selectable icon 1108. The tab group 1104 includes a first selectable icon 1110, a second selectable icon 1112, a third selectable icon 1114, and a fourth selectable icon 1116. The tab group 1104 includes a partial view of the icons in the tab group. The partial view may indicate to the user that the user may scroll to view additional icons. Menus and interactive controls may be presented in an easily selectable manner since the web browser application is configured to be touch-selectable. For example, a menu control 1118 configured to add icons to the tab group is shown enlarged over the tab strip 1100. Additional controls and menus may be provided with further interaction with tab groups 1102, 1104, or icons 1106-1116.

Figure 12:
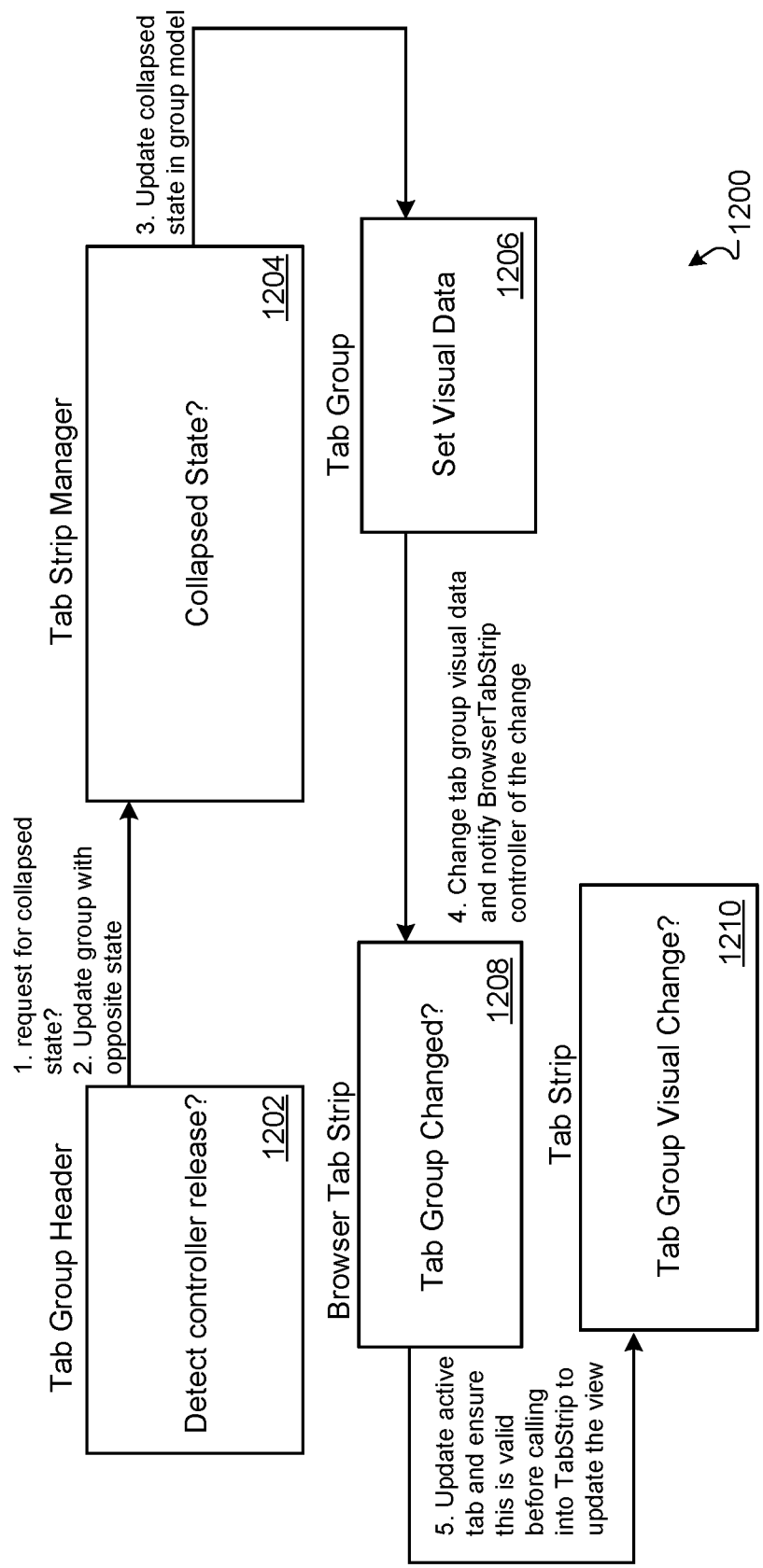
FIG. 12 is a flow diagram for an example process of updating a tab group UI based on a received collapse or expand command, in accordance with implementations described herein.

FIG. 12 is a flow diagram for an example process 1200 of updating a tab group UI based on a received collapse or expand command, in accordance with implementations described herein. In short, the process 1200 may include receiving (1202) a request in a tab group for a collapse state, updating (1204) the tab group with the opposite state (e.g., collapsed or expanded), updating (1206) the collapsed state in a group model for the tab group, indicating (1208) updates about the state of the tab group, and performing (1210) the update on the active tabs in the tab group.

There may be several approaches to collapsing tabs in a tab group. Example approaches may include a view-based approach, a controller-based approach, and a model-based approach. The view-based approach may include updating the bounds for each tab in a tab group. The model-based approach may include removing tabs from the model when the tab group is collapsed and holding the detached web contents outside of the tab strip. The controller-based approach may include removing the view from the tab strip, while keeping the view in the model.

The view-based approach is shown in process 1200. In general, actions taken on a tab strip occur with a single input. The actions may include selecting a browser tab, closing a browser tab, and dragging a browser tab. For example, when a user first selects a tab group header (e.g., name, identifier), it may be ambiguous as to whether the user is intending on dragging or toggling the collapsed state of the tab group. In order for a tab group header to be both separately draggable and collapsible, collapsing and expanding a group generally occurs in response to input release (e.g., mouse release, touch release, etc.). When a user drags the tab group header, the tab group generator intercepts the release event so that the tab group header will not receive the event. If the tab group header receives the release event, this means the user has not dragged the tab group header and has intended to collapse or expand the tab group. This pattern of collapsing a group on release may occur for both mouse and touch events. In some implementations, long press touch inputs may be differentiated when collapsing or expanding a tab group.

In operation when collapsing a tab group, the tab group generator 224 may determine whether an active (browser) tab is associated with the tab group. If the active tab is associated with the tab group, the active tab focus may be shifted to another available browser tab. The active tab generally will not change on expanding a tab group.

In general, a visual data for a tab group may be owned by a tab group class, which may monitor and update a tab group state and metadata of the tab group as well as handle notifications of the state changes. A tab strip controller class may utilize a collapsed tab group state mode to surface a collapsed state of the tab group to views such as the Tab Group Header and the Tab Strip, as shown in FIG. 12.

In operation, an example data flow for updating the visual data is to generate a function call to set visual data call, which generates a function call into a controller tab strip model, which notifies browser tab observers of the visibility change. The tab strip controller may be one of the observers of this model change. The tab strip controller may invoke a function to determine whether a particular tab group has changed to handle the visual data change. After the Tab Strip is notified of the visual change, Tab Strip invokes a call to a function to calculate the bounds for the tab group. The bounds are then set based on a method that calculates the tab group bounds.

To handle a potential group collapsed state change in response to a user selecting on the tab group header (e.g., Tab Group Header), the process 1200 detects a release of a controller (e.g., a mouse) which may request the Tab Strip Controller for the current collapsed state, and may then call a function to update the collapsed state of the tab group with the updated state by setting visual data 1206. Once the Tab Strip controller is notified of the model change, the Browser Tab Strip controller may then update the active tab before invoking the tab group visual change function to handle the new collapsed state change. In order to update the collapsed tab group bounds, a tab bounds calculator function may take into account whether or not the tab belongs to a collapsed group before performing the bounds calculation. The bounds of a collapsed tab is generally set to zero and then may be animated to the bounds of the tab group.

Figure 13:
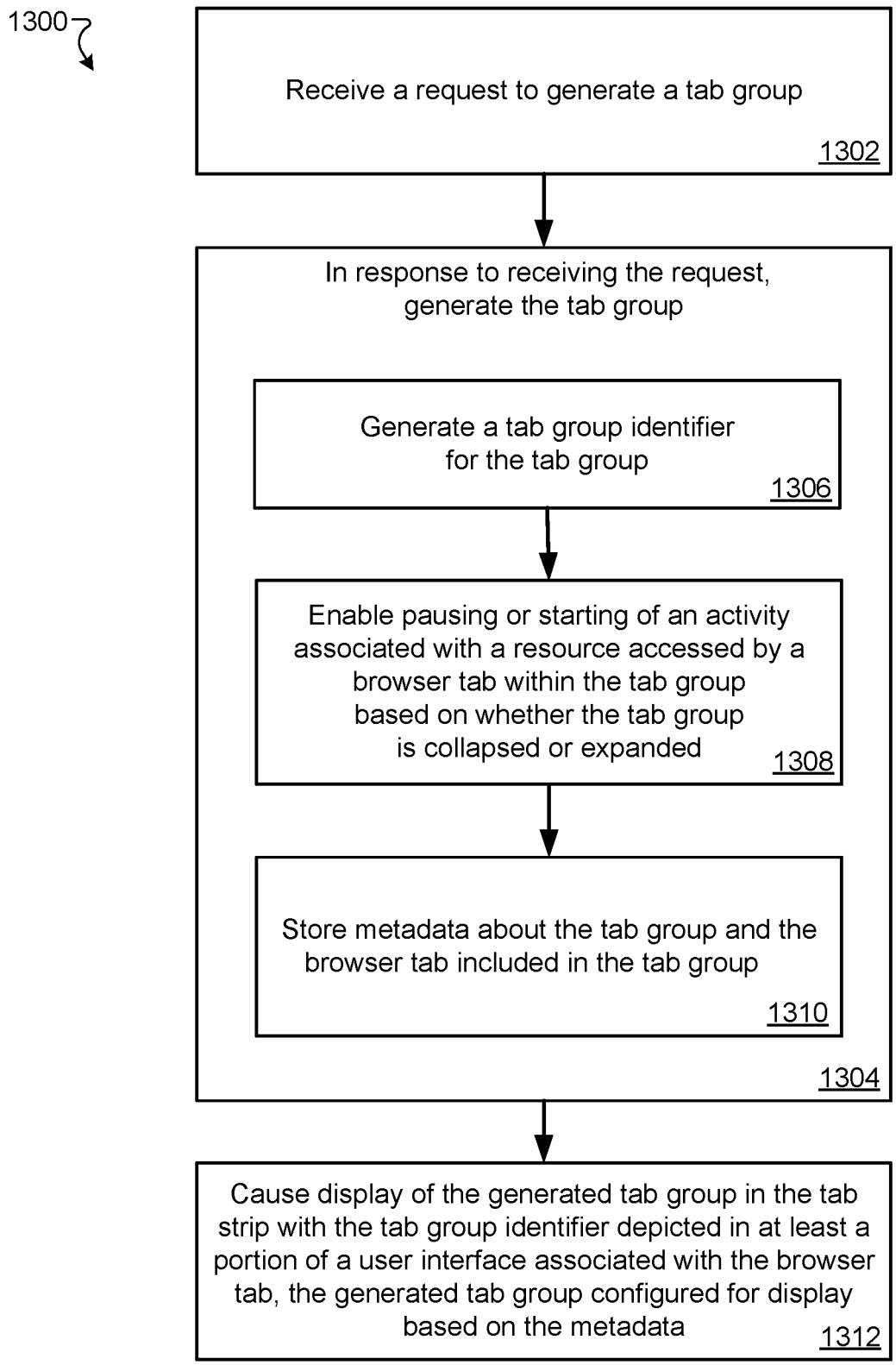
FIG. 13 is a flowchart of an example process for operating a tab group UI, in accordance with implementations described herein.

FIG. 13 is a flowchart of an example process 1300 for operating a tab group UI, in accordance with implementations described herein. In particular, the process 1300 may be used to generate and display any number of tab groups in a web browser. In some implementations, the tab groups are presented in a tab strip of the web browser. In some implementations, the tab groups are presented stacked, listed, or in icon form in a menu associated with the browser. In some implementations, the tab groups are presented in a collapsed state. In some implementations, the tab groups are presented in an expanded state. Particular input from a user or a browser process can trigger collapse or expansion of one or more tab groups.

In general, process 1300 utilizes the systems and algorithms described herein to generate and render tab groups in a tab strip. The process 1300 may utilize one or more computing systems with at least one processing device and memory storing instructions that when executed cause the processing device(s) to perform the plurality of operations and computer implemented steps described in the claims. In general, UI 100, UI 500A, 500B, or 500C, system 200, and/or system 1500 may be used in the description and execution of process 1300.

At block 1302, the process 1300 includes receiving a request to generate a tab group. In some implementations, the request is received in a tab strip generated by a web browser application. For example, a user may select a browser tab (e.g., tab 532 in FIG. 5C) or a menu (e.g., menu 502 in FIG. 5C) to request to generate a tab group for a particular browser tab (e.g., tab 532). In some implementations, a keyboard shortcut may be used to access the menu 502. In some implementations, the user may right click or left click on the tab using a mouse. In response, the browser 220 may trigger display of a menu or option to generate the tab group (e.g., tab group 112A). In some implementations, the request to generate the tab group is received in a menu generated by the web browser application where the menu provides at least an option to add any number of additional browser tabs to the tab group.

At block 1304, the process 1300 includes generating the tab group, in response to receiving the request. In particular, the browser 220 may trigger generation of a UI or menu in which to configure a tab group. Configuring a tab group may result in generation of the tab group. Generating a tab group may include, generating a tab group identifier, enabling one or more controls, commands, or activities, storing information about the tab group, and displaying the tab group in the tab strip or other browser or application portion.

At block 1306, the process 1300 includes generating a tab group identifier for the tab group. For example, a user may enter a tab group name (e.g., identifier) for display in a head portion of the tab group. In operation, a user may be presented a menu (e.g., menu 502), which may be triggered from a browser tab (e.g., tab 532 of FIG. 5C) in order to create a tab group. For example, a user may assess menu 502 via keyboard shortcut, mouse click, touch input, etc. and may be requested to enter a name (e.g., identifier) for a new tab group in which to add browser tab 532. In some implementations, the user may generate a new tab group, by selecting on the browser tab 532 to trigger the browser 220 to render menu 502. The user may utilize the control 512 and/or control 514 to name and identify the new tab group.

At block 1308, the process 1300 includes enabling pausing or starting of an activity associated with a resource accessed by a browser tab within the tab group based on whether the tab group is collapsed or expanded. For example, the tab group generator 224 may enable commands associated with one or more browser tabs configured for a tab group. The commands may be to pause (e.g., freeze) or start (e.g., resume) activities associated with one or more resources (e.g., memory resources, network resources, processing resources, information resources, website service resources, online document resources, communication resource, etc.) accessed by a particular browser tab within the tab group. For example, the activity may include memory or processing activities used for communicating with the resource, accessing the resource, or executing the activity associated with the resource. In some implementations, the resource may include at least one of a website, a web page, an application, a web application, an online document, a social networking platform, a link, and/or a network.

The pausing or starting of such activities may be triggered based on whether or not a tab group is in a collapsed state or in an expanded state. In addition, the pausing or starting of such activities may be triggered based on votes determined for a particular browser tab in the tab group, via decision engine 272, for example.

Enabling the functionality to pause one or more activities may include enabling the collapsing of one or more browser tabs into the tab group as a trigger to pause one or more activities in response to receiving a first selection on the tab group identifier. For example, the tab group generator 224 may enable the ability to detect a collapsed state for the tab group 508 (i.e., collapsed browser tabs), which may be used as an indicator to pause one or more activities (e.g., memory or processing related activities) associated with the collapsed browser tabs when a user selects the tab group to trigger the collapse the browser tabs.

In general, collapsing the browser tab into the tab group removes at least a portion of the tab strip from display in the web browser application and pauses execution of portions of a browser process associated with the browser tab. For example, if the browser 220 detects a collapse command associated with the tab group 504, the browser 220 (e.g., via a browser process, tab group generate 224) may remove tabs (e.g., tabs 532A, 542A, and 544A) from view in the tab strip 510 and simultaneously pause any or all activities associated with resources accessed or used by the browser tabs (e.g., tabs 532A, 542A, and 544A) being collapsed.

Enabling the functionality to start one or more activities may include enabling expansion of the one or more browser tabs from the tab group to trigger starting of the activity in response to receiving a second selection on the tab group identifier. For example, triggering expansion of one or more browser tabs (e.g., tabs 532A, 542A, and 544A) from a tab group (e.g., tab group 504) may enable the ability to detect an expanded state for the tab group in response to detecting a user selection of the tab group 504, which may trigger activities to start (or resume) for the browser tabs (e.g., tabs 532A, 542A, and 544A). In general, the process 1300, in response to receiving a first selection on the tab group identifier, may include triggering collapsing of a browser tab into the tab group to trigger the pausing of the activity. If the tab group generator 224 detects another selection (i.e., as second selection received after the first selection) on the tab group identifier (e.g., a tab group name), the tab group generator 224 may expand the browser tab from the tab group to trigger the starting of the activity.

In general, the activity may include communicating with the resource, accessing the resource, or executing the activity associated with the resource. For example, the activity may include memory or processing activities used for communicating with the resource, accessing the resource, or executing the activity associated with the resource. The resource may include at least one of a website, a web page, an application, a web application, an online document, a social networking platform, a link, and/or a network.

In some implementations, the browser 220 may disable the pausing for the activity associated with the resource in response to determining that content provided by the resource accessed by the browser tab includes streaming audio data. For example, if the browser 220 determines that tab 544A is streaming or playing audio data from a resource accessed by the browser tab 544A, then the browser 220 may disable the pausing of the activity associated with the particular tab even while pausing other activities for other tabs associated with the tab group 504. This may be convenient to allow a user to continue listening to the audio while still pausing other activities to save memory and processing time and power.

In some implementations, the browser 220 may be configured to disable a pausing activity for a particular resource accessed by the browser tab in response to determining that the resource accessed by the browser tab is configured to reject resource pause requests associated with the browser tab. For example, the system 200 may configure particular browser tabs that access particular resources to reject (e.g., not perform, not execute, ignore, etc.) commands received to pause the resource if the command is detected as an expand or collapse input on the browser tab group. In this way, the system 200 can avoid pausing resources (e.g., audio, video, high-resource consuming tabs, etc.) if the system 200 determines that pausing such resources would not be desirable (e.g., would not be convenient) to the user accessing the browser.

In some implementations, the browser 220 may be configured to disable the starting of a particular activity associated with the resource accessed by a browser tab, in response to determining that the browser tab is configured with a permission to reject a start request that is detected to be triggered by a command to expand the tab group. For example, any number of permissions and conditions (e.g., permissions 254 and/or preferences 256) may be configured for particular browser tabs, resources, content access, etc. The system 200 may assess such permissions and conditions in combination with assessing received expand and collapse commands for browser tab groups. For example, if an expand command is detected for a particular tab group, the system 200 may assess whether resources or content triggered to be started (based on the received command) also meet the permissions and conditions configured for the overall browser or browser tab.

In some implementations, a start command triggered by an expand tab group input may be disabled if the user configures a permission for the browser, for a specific tab group, for a specific browser tab, and the permission thresholds or rules are not satisfied (e.g., met) by the browser state at the time of the received command. For example, if the user configures permissions 254 for a browser tab to begin communicating to a server upon detecting a command to expand a tab group when memory and/or processing resources are below a particular threshold. Such permissions may ensure that the browser does not decrease (e.g., slow) performance of itself and/or the computing system executing the browser if memory and processing resources are already at or over capacity (e.g., fully utilized). In some implementations, the disabling of the start command triggered by the expand tab group input may be temporarily disabled according to user permissions. In the example above, the disabling may time out after the browser or computing system no longer exceeds one or more thresholds and/or violates (e.g., breaks) the configured rules.

In some implementations, pausing and starting (e.g., resuming) activities associated with browser tabs may be based on the type of content accessed by the tab. For example, if the content is actively executing calculations triggered by the user, the pause commands may be ignored. Similarly, if the system 200 detects that the browser tab is accessed a threshold amount of time during the day, the system 200 may ignore pause commands. If the system 200 detects that the browser tab is not accessed at a predefined threshold level, then the system 200 can ignore starting commands until another condition is met. For example, the system 200 may ignore a start command for a browser tab meeting particular lack of use thresholds until the user actively selects on the browser tab.

Other permissions and/or conditions may include assessing particular memory and processor bandwidths used by particular tabs and/or resources accessed by the tabs, determining pause command and/or start command execution based on a number of tabs currently open in the browser, determining a number of days passed since access of a particular tab or resource, and/or determining a state of one or more browser processes to make a decision to pause or start activities or resources associated with a tab, just to name a few examples.

At block 1310, the process 1300 includes storing metadata (e.g., metadata 280) about the tab group and the browser tab included in the tab group. Storing the metadata enables restoration of the tab group and associated browser tab according to the metadata in response to detecting a request to reopen the web browser application. In some implementations, storing the metadata ensures that the decision engine 272 can adhere to tab group policies 278.

In some implementations, the metadata includes at least data indicating a freeze flag decision for the browser tab indicating whether to allow the pausing or starting of the activity associated with the resource. In some implementations, the metadata includes at least data indicating a browser tab state flag indicating whether the browser tab is in a collapsed state or expanded state. In some implementations, the metadata includes at least data indicating connection data associated with the resource.

At block 1312, the process 1300 includes causing display of the generated tab group in the tab strip with the tab group identifier depicted in at least a portion of a user interface associated with the browser tab and the generated tab group is configured for display based on the metadata. For example, a renderer (e.g., renderer 282) may receive a trigger to cause display of tab groups (e.g., tabs 532A, 542A, and 544A from tab group 504). The renderer 282 may depict the tab groups in a portion of the web browser, such as the tab strip 510 or other area. The tab group identifier (e.g., the name) may be displayed in a portion of the tab group header shown by tab group 504 (e.g., FIG. 5B).

In some implementations, the process 1300 further includes generating a plurality of additional tab groups where each additional tab group is associated with a respective plurality of browser tabs. For example, a user may access the browser 220 to trigger the tab group generator 224 to generate tabs in the tab strip, as shown by tab groups 504, 506, and 508 (FIG. 5A). For each additional tab group, the tab group generator 224 may assign a visual indicator to the respective plurality of browser tabs. The visual indicator may include a name, a symbol, an image, an animation, or other identifier for the tab group that is rendered in the tab group header.

In operation, any input received on the visual indicator may function to cause collapsing or expansion of the respective plurality of browser tabs in the respective tab group. For example, a user may have selected a portion of the 'Productivity' tab group name of the tab group 504 (FIG. 5B). Selecting on the portion may have triggered expansion of the browser tabs (e.g., 532A, 542A, and 544A) because the browser tabs are associated with the tab group 504. Similarly, the user may have selected a portion of the name on tab group 508 to trigger expansion or in this case collapsing of tab group 508, as shown by the lack of browser tab visibility for tab group 508 in FIG. 5B. In some implementations, the process 1300 may also enable access to one or more menus (e.g., such as menus 502 or 536) generated by the browser application 220. The menu may be configured to apply modifications to a respective tab group in the plurality of additional tab groups. For example, the menu may be used according to the descriptions of FIG. 5A-5C.

Figure 14:
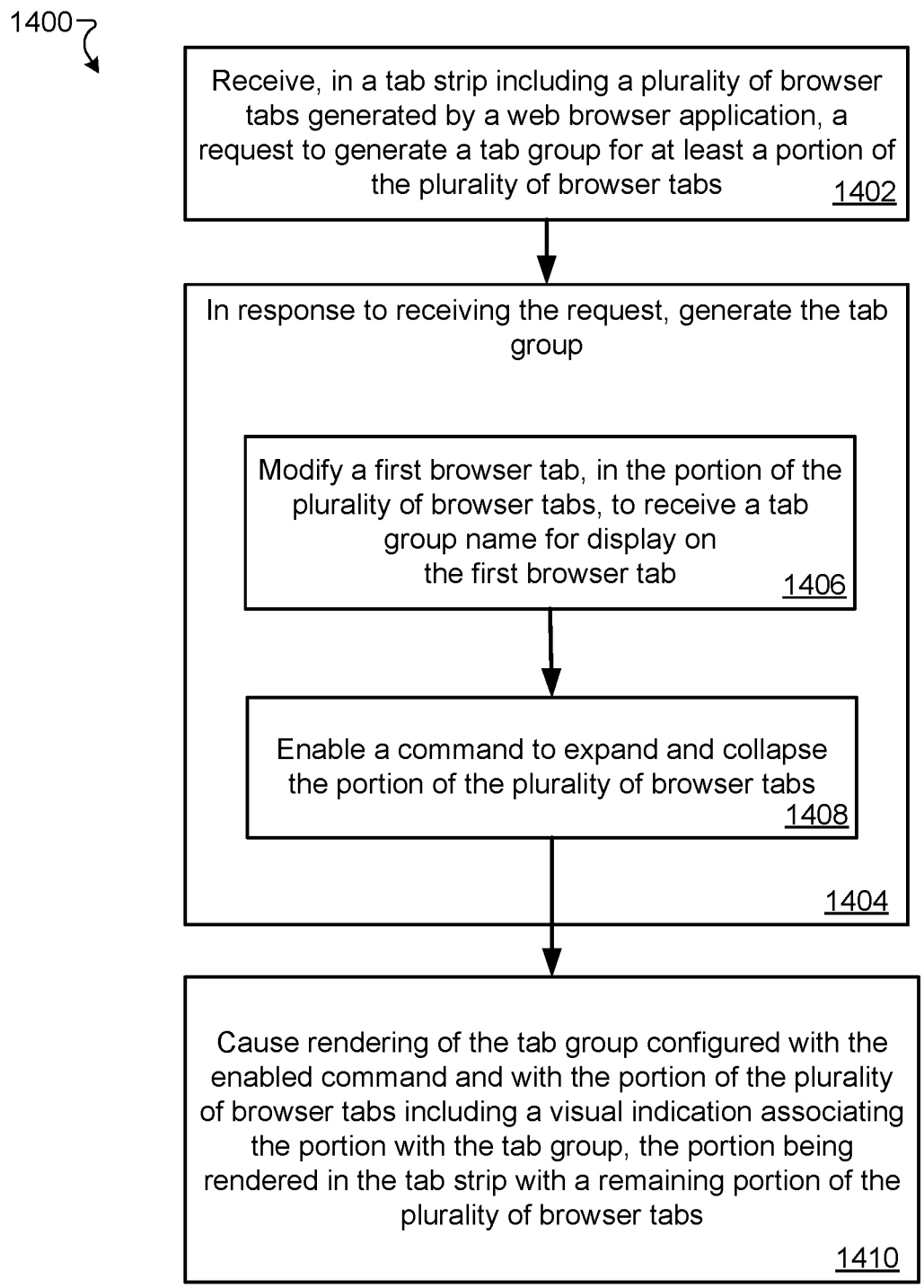
FIG. 14 is a flowchart of another example process for operating a tab group UI, in accordance with implementations described herein.

FIG. 14 is a flowchart of another example process 1400 for operating a tab group UI, in accordance with implementations described herein. In particular, the process 1400 may be used to generate and display any number of tab groups in a web browser. In some implementations, the tab groups are presented in a tab strip of the web browser. In some implementations, the tab groups are presented stacked, listed, or in icon form in a menu associated with the browser. In some implementations, the tab groups are presented in a collapsed state. In some implementations, the tab groups are presented in an expanded state. Particular input from a user or a browser process can trigger collapse or expansion of one or more tab groups.

In general, process 1400 utilizes the systems and algorithms described herein to generate and render tab groups in a tab strip. The process 1400 may utilize one or more computing systems with at least one processing device and memory storing instructions that when executed cause the processing device(s) to perform the plurality of operations and computer implemented steps described in the claims. In general, UI 100, UI 500A, 500B, or 500C, system 200, and/or system 1500 may be used in the description and execution of process 1400.

At block 1402, the process 1400 includes receiving, in a tab strip including a plurality of browser tabs generated by a web browser application, a request to generate a tab group for at least a portion of the plurality of browser tabs. For example, a user may select within the tab strip 510 (FIG. 5C) in response to browser tab 532 to receive a rendered context menu or other indicator UI (e.g., menu 502). The rendered context menu or indicator UI can be associated with the particular browser tab that was selected. Accordingly, the user may enter a name for the tab group (e.g., via control 512), may enter other data and/or configure other browser tabs for the tab group.

At block 1404, the process 1400 may generate the tab group in response to receiving the request. For example, in response to entering the name and/or other data, etc., the tab group generator 224 may trigger generation of the tab group (e.g., tab group 504 of FIG. 5B).

At block 1406, the process 1400 describes generating the tab group, which includes modifying a first browser tab, in the portion of the plurality of browser tabs, to receive a tab group name for display on the first browser tab. For example, in response to receiving input in the tab strip 510 (e.g., on browser tab 532 of FIG. 5C), the tab group generator 224 may modify the UI of the tab 532 to render a tab group name in the browser tab. In some implementations, the tab group generator 224 may instead modify a portion of the tab strip 510 near the selected tab 532 to insert a tab group name pertaining to tab 532. In some implementations, other parts of the browser UI may be modified to receive and display a tab group name for display on or near a first browser tab (e.g., tab 532) of the tab group (e.g., tab group 504 of FIG. 5B).

At block 1408, the process 1400 further describes generating the tab group, which includes enabling a command to expand and collapse the portion of the plurality of browser tabs. For example, the tab group generator 224 may enable the tab group being generated with an input command that can trigger collapse and expansion of the tabs in the tab group. For example, a left click or touch on the tab group name (e.g., tab group header) may trigger an expansion of all browser tabs associated with the tab group. The expansion may unhide and list the browser tabs associated with the tab group. The list may be menu style or within the tab group across the tab strip 510. In some implementations, multiple rows of tabs may be shown in response to receiving an expansion command.

The collapse command may hide (e.g., remove from view) each tab associated with the tab group. Removing tabs from view may include re-rendering the tab group header (e.g., name) in the tab strip without depicting tabs associated with the tab group. In addition, the browser 220 may also shift other tabs or tab groups in the tab strip 510 to take the place of the hidden content. This may provide for additional real estate in the tab strip 510.

At block 1410, the process 1400 includes causing rendering of the tab group configured with the enabled command and with the portion of the plurality of browser tabs including a visual indication associating the portion with the tab group. For example, when the tab group 504 is generated the visual indicator 546 is generated and rendered for each tab associated with the tab group. As new tabs are added to the tab group 504, the visual indicator 546 is extended to encompass the new tabs. Although the visual indicator 546 is depicted as a line beneath the tabs, any visual indicator may be rendered to indicate tabs are associated with one another as well as a particular tab group. In general, generating a new tab group ensures that the portion of tabs associated with the tab group is depicted with the tab group and rendered in the tab strip 510 alongside a remaining portion of the plurality of browser tabs, which may be associated with other respective tab groups or no tab group. In some implementations, the tab group caused to be rendered in the tab strip 510 may be triggered based on detecting input corresponding to the enabled command and the tab group name. That is, if the user selects the tab group name (e.g., identifier), the tab group generator 224 may trigger the command to collapse or expand browser tabs associated with the tab group.

Figure 15:
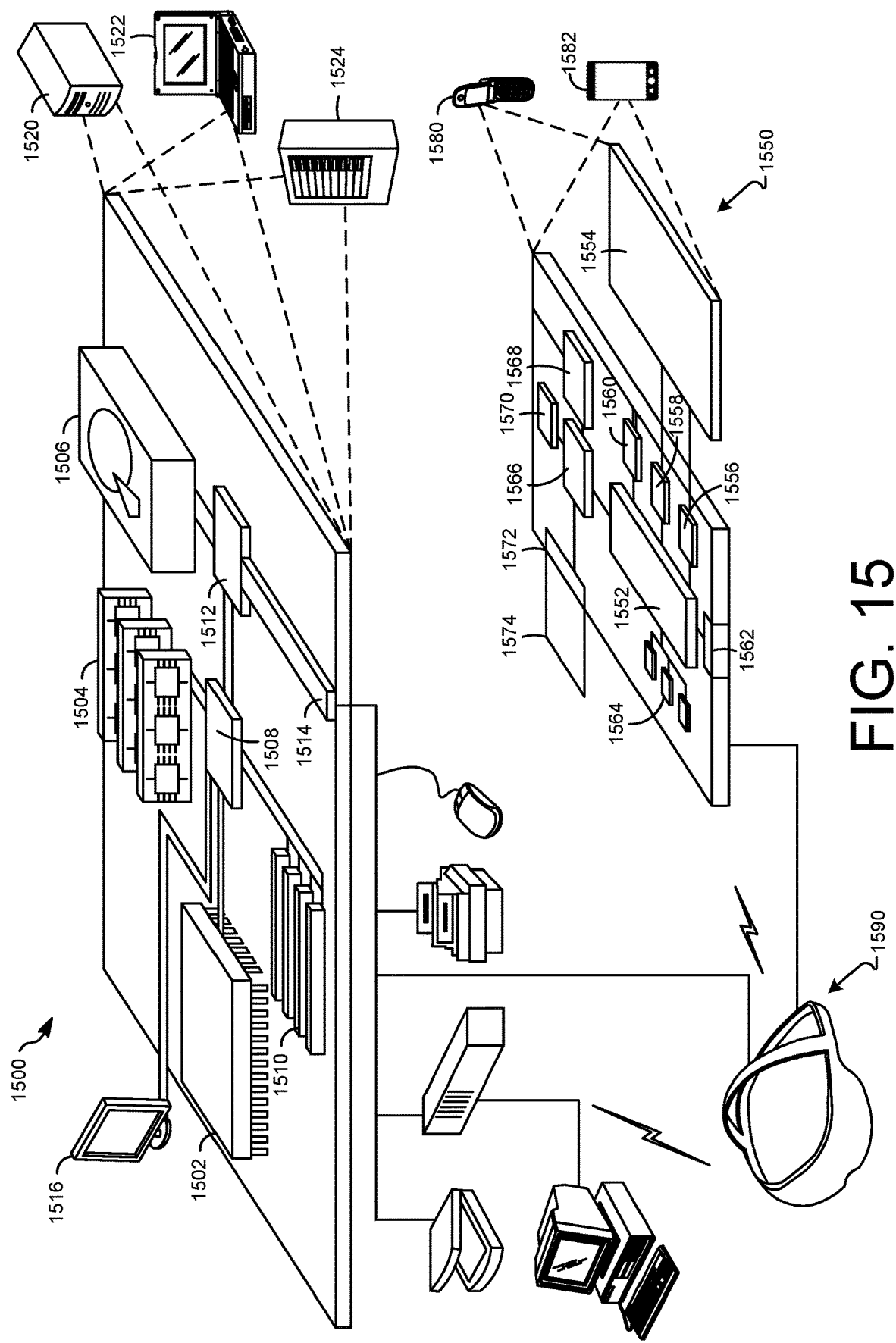
FIG. 15 shows an example of a computer device and a mobile computer device that can be used to implement the techniques described herein.

FIG. 15 shows an example of a computer device 1500 and a mobile computer device 1550, which may be used with the techniques described here. Computing device 1500 is intended to represent various forms of digital computers, such as laptops, desktops, tablets, workstations, personal digital assistants, smart devices, appliances, electronic sensor-based devices, televisions, servers, blade servers, mainframes, and other appropriate computing devices. Computing device 1550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1500 includes a processor 1502, memory 1504, a storage device 1506, a high-speed interface 1508 connecting to memory 1504 and high-speed expansion ports 1510, and a low speed interface 1512 connecting to low speed bus 1514 and storage device 1506. The processor 1502 can be a semiconductor-based processor. The memory 1504 can be a semiconductor-based memory. Each of the components 1502, 1504, 1506, 1508, 1510, and 1512, are interconnected using various busses, and may be mounted on a common motherboard or in other manners as appropriate. The processor 1502 can process instructions for execution within the computing device 1500, including instructions stored in the memory 1504 or on the storage device 1506 to display graphical information for a GUI on an external input/output device, such as display 1516 coupled to high speed interface 1508. In other implementations, multiple processors and/or multiple buses may be used, as appropriate, along with multiple memories and types of memory. Also, multiple computing devices 1500 may be connected, with each device providing portions of the necessary operations (e.g., as a server bank, a group of blade servers, or a multi-processor system).

The memory 1504 stores information within the computing device 1500. In one implementation, the memory 1504 is a volatile memory unit or units. In another implementation, the memory 1504 is a non-volatile memory unit or units. The memory 1504 may also be another form of computer-readable medium, such as a magnetic or optical disk. In general, the computer-readable medium may be a non-transitory computer-readable medium.

The storage device 1506 is capable of providing mass storage for the computing device 1500. In one implementation, the storage device 1506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods and/or computer-implemented methods, such as those described above. The information carrier is a computer- or machine-readable medium, such as the memory 1504, the storage device 1506, or memory on processor 1502.

The high speed controller 1508 manages bandwidth-intensive operations for the computing device 1500, while the low speed controller 1512 manages lower bandwidth-intensive operations. Such allocation of functions is exemplary only. In one implementation, the high-speed controller 1508 is coupled to memory 1504, display 1516 (e.g., through a graphics processor or accelerator), and to high-speed expansion ports 1510, which may accept various expansion cards (not shown). In the implementation, low-speed controller 1512 is coupled to storage device 1506 and low-speed expansion port 1514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1500 may be implemented in a number of different forms, as shown in the figure. For example, it may be implemented as a standard server 1520, or multiple times in a group of such servers. It may also be implemented as part of a rack server system 1524. In addition, it may be implemented in a computer such as a laptop computer 1522. Alternatively, components from computing device 1500 may be combined with other components in a mobile device (not shown), such as device 1550. Each of such devices may contain one or more of computing device 1500, 1550, and an entire system may be made up of multiple computing devices 1500, 1550 communicating with each other.

Computing device 1550 includes a processor 1552, memory 1564, an input/output device such as a display 1554, a communication interface 1566, and a transceiver 1568, among other components. The device 1550 may also be provided with a storage device, such as a microdrive or other device, to provide additional storage. Each of the components 1550, 1552, 1564, 1554, 1566, and 1568, are interconnected using various buses, and several of the components may be mounted on a common motherboard or in other manners as appropriate.

The processor 1552 can execute instructions within the computing device 1550, including instructions stored in the memory 1564. The processor may be implemented as a chipset of chips that include separate and multiple analog and digital processors. The processor may provide, for example, for coordination of the other components of the device 1550, such as control of user interfaces, applications run by device 1550, and wireless communication by device 1550.

Processor 1552 may communicate with a user through control interface 1558 and display interface 1556 coupled to a display 1554. The display 1554 may be, for example, a TFT LCD (Thin-Film-Transistor Liquid Crystal Display) or an OLED (Organic Light Emitting Diode) display, or other appropriate display technology. The display interface 1556 may comprise appropriate circuitry for driving the display 1554 to present graphical and other information to a user. The control interface 1558 may receive commands from a user and convert them for submission to the processor 1552. In addition, an external interface 1562 may be provided in communication with processor 1552, so as to enable near area communication of device 1550 with other devices. External interface 1562 may provide, for example, for wired communication in some implementations, or for wireless communication in other implementations, and multiple interfaces may also be used.

The memory 1564 stores information within the computing device 1550. The memory 1564 can be implemented as one or more of a computer-readable medium or media, a volatile memory unit or units, or a non-volatile memory unit or units. Expansion memory 1574 may also be provided and connected to device 1550 through expansion interface 1572, which may include, for example, a SIMM (Single In Line Memory Module) card interface. Such expansion memory 1574 may provide extra storage space for device 1550, or may also store applications or other information for device 1550. Specifically, expansion memory 1574 may include instructions to carry out or supplement the processes described above, and may include secure information also. Thus, for example, expansion memory 1574 may be provided as a security module for device 1550, and may be programmed with instructions that permit secure use of device 1550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1564, expansion memory 1574, or memory on processor 1552, that may be received, for example, over transceiver 1568 or external interface 1562.

Device 1550 may communicate wirelessly through communication interface 1566, which may include digital signal processing circuitry where necessary. Communication interface 1566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1568. In addition, short-range communication may occur, such as using a Bluetooth, Wi-Fi, or other such transceiver (not shown). In addition, GPS (Global Positioning System) receiver module 1570 may provide additional navigation- and location-related wireless data to device 1550, which may be used as appropriate by applications running on device 1550.

Device 1550 may also communicate audibly using audio codec 1560, which may receive spoken information from a user and convert it to usable digital information. Audio codec 1560 may likewise generate audible sound for a user, such as through a speaker, e.g., in a handset of device 1550. Such sound may include sound from voice telephone calls, may include recorded sound (e.g., voice messages, music files, etc.) and may also include sound generated by applications operating on device 1550.

The computing device 1550 may be implemented in a number of different forms, as shown in the figure. For example, it may be implemented as a cellular telephone 1580. It may also be implemented as part of a smart phone 1582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as modules, programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor, or LED (light emitting diode)) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback), and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some embodiments, the computing devices depicted in FIG. 15 can include sensors that interface with a virtual reality or headset (VR headset/AR headset/HMD device 1590). For example, one or more sensors included on computing device 1550 or other computing device depicted in FIG. 15, can provide input to AR/VR headset 1590 or in general, provide input to an AR/VR space. The sensors can include, but are not limited to, a touchscreen, accelerometers, gyroscopes, pressure sensors, biometric sensors, temperature sensors, humidity sensors, and ambient light sensors. Computing device 1550 can use the sensors to determine an absolute position and/or a detected rotation of the computing device in the AR/VR space that can then be used as input to the AR/VR space. For example, computing device 1550 may be incorporated into the AR/VR space as a virtual object, such as a controller, a laser pointer, a keyboard, a weapon, etc. Positioning of the computing device/virtual object by the user when incorporated into the AR/VR space can allow the user to position the computing device to view the virtual object in certain manners in the AR/VR space.

In some embodiments, one or more input devices included on, or connect to, the computing device 1550 can be used as input to the AR/VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1550 when the computing device is incorporated into the AR/VR space can cause a particular action to occur in the AR/VR space.

In some embodiments, one or more output devices included on the computing device 1550 can provide output and/or feedback to a user of the AR/VR headset 1590 in the AR/VR space. The output and feedback can be visual, tactical, or audio. The output and/or feedback can include, but is not limited to, rendering the AR/VR space or the virtual environment, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some embodiments, computing device 1550 can be placed within AR/VR headset 1590 to create an AR/VR system. AR/VR headset 1590 can include one or more positioning elements that allow for the placement of computing device 1550, such as smart phone 1582, in the appropriate position within AR/VR headset 1590. In such embodiments, the display of smart phone 1582 can render stereoscopic images representing the AR/VR space or virtual environment.

In some embodiments, the computing device 1550 may appear as another object in a computer-generated, 3D environment. Interactions by the user with the computing device 1550 (e.g., rotating, shaking, touching a touchscreen, swiping a finger across a touch screen) can be interpreted as interactions with the object in the AR/VR space. As just one example, computing device can be a laser pointer. In such an example, computing device 1550 appears as a virtual laser pointer in the computer-generated, 3D environment. As the user manipulates computing device 1550, the user in the AR/VR space sees movement of the laser pointer. The user receives feedback from interactions with the computing device 1550 in the AR/VR environment on the computing device 1550 or on the AR/VR headset 1590.

In some embodiments, a computing device 1550 may include a touchscreen. For example, a user can interact with the touchscreen in a particular manner that can mimic what happens on the touchscreen with what happens in the AR/VR space. For example, a user may use a pinching-type motion to zoom content displayed on the touchscreen. This pinching-type motion on the touchscreen can cause information provided in the AR/VR space to be zoomed. In another example, the computing device may be rendered as a virtual book in a computer-generated, 3D environment. In the AR/VR space, the pages of the book can be displayed in the AR/VR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some embodiments, one or more input devices in addition to the computing device (e.g., a mouse, a keyboard) can be rendered in a computer-generated, 3D environment. The rendered input devices (e.g., the rendered mouse, the rendered keyboard) can be used as rendered in the AR/VR space to control objects in the AR/VR space.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Further to the descriptions above, a user is provided with controls allowing the user to make an election as to both if and when systems, programs, devices, networks, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that user information is removed. For example, a user's identity may be treated so that no user information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

The computer system (e.g., computing device) may be configured to wirelessly communicate with a network server over a network via a communication link established with the network server using any known wireless communications technologies and protocols including radio frequency (RF), microwave frequency (MWF), and/or infrared frequency (IRF) wireless communications technologies and protocols adapted for communication over the network.

In accordance with aspects of the disclosure, implementations of various techniques described herein may be implemented in digital electronic circuitry, or in computer hardware, firmware, software, or in combinations of them. Implementations may be implemented as a computer program product (e.g., a computer program tangibly embodied in an information carrier, a machine-readable storage device, a computer-readable medium, a tangible computer-readable medium), for processing by, or to control the operation of, data processing apparatus (e.g., a programmable processor, a computer, or multiple computers). In some implementations, a tangible computer-readable storage medium may be configured to store instructions that when executed cause a processor to perform a process. A computer program, such as the computer program(s) described above, may be written in any form of programming language, including compiled or interpreted languages, and may be deployed in any form, including as a standalone program or as a module, component, subroutine, or other unit suitable for use in a computing environment. A computer program may be deployed to be processed on one computer or on multiple computers at one site or distributed across multiple sites and interconnected by a communication network.

Specific structural and functional details disclosed herein are merely representative for purposes of describing example embodiments. Example embodiments, however, may be embodied in many alternate forms and should not be construed as limited to only the embodiments set forth herein.

The terminology used herein is for the purpose of describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 70 degrees or at other orientations) and the spatially relative descriptors used herein may be interpreted accordingly.

Example embodiments of the concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the described concepts should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of example embodiments.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present embodiments.

Unless otherwise defined, the terms (including technical and scientific terms) used herein have the same meaning as commonly understood by one of ordinary skill in the art to which these concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents will now occur to those skilled in the art. It is, therefore, to be understood that the appended claims are intended to cover such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A computer-implemented method comprising:
   receiving, in a tab strip of a web browser application, a request to generate a tab group that includes a browser tab in the tab strip;
   in response to receiving the request:
      causing display of a tab group area associated with the browser tab and configured to receive a tab group name for display, the tab group area configured to toggle expansion and contraction of the browser tab within the tab strip in response to a release of a select input on the tab group area; and
      causing display of the tab group in an expanded state and in the tab strip with the tab group area depicted in the tab strip associated with the browser tab;
   receiving a selection on the tab group area; and
   in direct response to receiving the selection:
      changing the tab group from the expanded state to a collapsed state,
      setting a flag for the browser tab based on an activity associated with a resource accessed by the browser tab and a tab group policy associated with the tab group, and
      pausing the activity based on the flag.

2. The computer-implemented method of claim 1, wherein collapsing the browser tab into the tab group removes at least a portion of the tab strip from display in the web browser application, the activity includes execution of portions of a browser process associated with the browser tab.

3. The computer-implemented method of claim 1, further comprising:
   setting the flag to disable the pausing of the activity associated with the resource in, according to the tab group policy, and response to determining that content provided by the resource accessed by the browser tab includes streaming audio data.

4. The computer-implemented method of claim 1, further comprising:
   setting the flag to disable the pausing of the activity associated with the resource, according to the tab group policy, and in response to determining that the resource accessed by the browser tab is configured to reject resource pause requests associated with the browser tab.

5. The computer-implemented method of claim 1, further comprising:
   storing metadata about the tab group and the browser tab;

detecting a request to reopen the web browser application; and restoring the tab group and associated browser tab according to the metadata.

6. The computer-implemented method of claim 1, wherein the tab group is a first tab group, the tab group area is a first tab group area, the computer-implemented method further comprising:

generating a second tab group, the second tab group being associated with a plurality of browser tabs; and for the second tab group:

assigning a second tab group area to the plurality of browser tabs, wherein input received on the second tab group area causes contraction or expansion of the plurality of browser tabs in the second tab group; and enabling access to a menu generated by the web browser application, the menu configured to apply modifications to the second tab group.

7. The computer-implemented method of claim 1, wherein the activity includes memory or processing activities used for communicating with the resource, accessing the resource, or executing the activity associated with the resource, the resource including at least one of a website, a web page, an application, a web application, an online document, a social networking platform, a link, or a network.

8. The computer-implemented method of claim 1, wherein the request to generate the tab group is received in a menu generated by the web browser application, the menu providing at least an option to add any number of additional browser tabs to the tab group.

9. The computer-implemented method of claim 1, wherein the selection of the tab group area is a first selection, the method further comprising:

receiving a second selection on the tab group area; and in response to determining that the tab group is in the collapsed state:

changing the tab group from the collapsed state to the expanded state, setting the flag for the browser tab based on a starting condition related to the activity and associated with the browser tab and a threshold value, and starting the activity based on the flag.

10. The computer-implemented method of claim 9, wherein the flag is a first flag and the computer-implemented method further comprises:

storing metadata about the tab group and the browser tab included in the tab group, the metadata includes at least data indicating:

the first flag indicating whether to allow the pausing of the activity or the starting of the activity associated with the resource;

a second flag indicating whether the browser tab is in the collapsed state or the expanded state; and connection data associated with the resource.

11. The computer-implemented method of claim 9, further comprising:

setting the flag to disable the starting of the activity associated with the resource accessed by the browser tab when the starting condition includes a permission to reject a start request detected to be triggered by a command to expand the tab group.

12. The computer-implemented method of claim 1, further comprising:

determining a topic associated with contents of the browser tab, generating a topic-related label for the tab group based on the topic, and setting, for display, a tab group name of the tab group to the topic-related label.

13. A non-transitory computer-readable medium including instructions that, when executed, are configured to cause at least one processor to perform a method, the method comprising:

receiving, in a tab strip generated by a web browser application, a request to generate a tab group;

in response to receiving the request, determining a topic associated with contents of a browser tab included in the tab group, generating a topic-related label for the tab group based on the topic, and causing display of the tab group in an expanded state, the tab group having a tab group identifier set to the topic-related label;

receiving a selection of the tab group in the tab strip;

in direct response to receiving the selection:

changing the tab group from the expanded state to a collapsed state, setting a flag for the browser tab based on an activity associated with a resource accessed by the browser tab and a tab group policy associated with the tab group, and pausing the activity based on the flag;

storing metadata about the tab group and the browser tab included in the tab group; and causing display of the tab group in the tab strip with the tab group identifier depicted in a portion of the tab strip associated with the browser tab, the tab group being configured for display based on the metadata.

14. The non-transitory computer-readable medium of claim 13, wherein the tab group, when in the collapsed state, results in at least a portion of the tab strip being removed from display in the web browser application and pauses execution of portions of a browser process associated with the browser tab.

15. The non-transitory computer-readable medium of claim 13, the method further comprising:

setting the flag to disable the pausing of the activity associated with the resource, according to the tab group policy, and in response to determining that content provided by the activity associated with the resource accessed by the browser tab includes streaming audio data.

16. The non-transitory computer-readable medium of claim 13, wherein the request to generate the tab group is received in a menu generated by the web browser application, the menu providing at least an option to add any number of additional browser tabs to the tab group.

17. The non-transitory computer-readable medium of claim 13, wherein the selection of the tab group is a first selection, the method further comprising:

receiving a second selection of the tab group in the tab strip; and in response to determining that the tab group is in the collapsed state:

changing the tab group from the collapsed state to the expanded state, setting the flag for the browser tab based on a starting condition related to the activity and associated with the browser tab and a threshold value, and starting the activity based on the flag.

18. The non-transitory computer-readable medium of claim 17, wherein the flag is a first flag and the metadata includes at least data indicating:

the flag indicating whether to allow the pausing of the activity or the starting of the activity associated with the resource;

a second flag indicating whether the browser tab is in the collapsed state or the expanded state; and connection data associated with the resource.

19. A system, comprising:

at least one processor; and a memory storing instructions that, when executed by the at least one processor, cause the at least one processor to perform operations comprising:

receiving, in a tab strip of a web browser application, a request to generate a tab group that includes a browser tab in the tab strip;

in response to receiving the request:

determining a topic associated with contents of the browser tab, generating a topic-related label for the tab group based on the topic, generating a tab group area for the tab group, the tab group area having a tab group name set to the topic-related label and configured to toggle expansion and contraction of the browser tab within the tab strip in response to a release of a select input on the tab group; and causing display of the tab group in the tab strip with the tab group area depicted in the tab strip associated with the browser tab;

receiving a selection on the tab group area;

in direct response to receiving the selection and determining that the tab group is in an expanded state, changing the tab group from the expanded state to a collapsed state, setting a flag for the browser tab based on an activity associated with a resource accessed by the browser tab and a tab group policy associated with the tab group, and pausing the activity based on the flag; and in direct response to receiving the selection and determining that the tab group is in the collapsed state, changing the tab group from the collapsed state to the expanded state, setting the flag for the browser tab based on a starting condition related to the activity and associated with the browser tab and a threshold value, and starting the activity based on the flag.

20. The system of claim 19, wherein the tab group, when in the collapsed state, results in at least a portion of the tab strip being removed from display in the web browser application and pauses execution of portions of a browser process associated with the browser tab.

21. The system of claim 19, wherein the flag is a first flag and the operations further comprise:

storing metadata about the tab group and the browser tab included in the tab group, the metadata includes at least data indicating:

the flag indicating whether to allow the pausing of the activity or the starting of the activity associated with the resource;

a second flag indicating whether the browser tab is in the collapsed state or the expanded state; and connection data associated with the resource.

22. The system of claim 19, wherein the operations further comprise:

setting the flag to disable the pausing of the activity associated with the resource, according to the tab group policy, and in response to determining that content provided by the activity associated with the resource accessed by the browser tab includes streaming audio data.

23. The system of claim 19, further comprising:

setting the flag to disable the pausing of the activity associated with the resource, according to the tab group policy, and in response to determining that the resource accessed by the browser tab is configured to reject resource pause requests associated with the browser tab.

24. The system of claim 19, further comprising:

setting the flag to disable the starting of the activity associated with the resource accessed by the browser tab when the starting condition includes a permission to reject a start request detected to be triggered by a command to expand the tab group.

25. A computer-implemented method comprising:

receiving, in a tab strip including a plurality of browser tabs of a web browser application, a request to generate a tab group for at least a portion of the plurality of browser tabs;

in response to receiving the request:

causing display of a tab group area associated with the portion of the plurality of browser tabs, the tab group area configured to toggle expansion and collapse of the portion of the plurality of browser tabs within the tab strip in response to a release of a select input on the tab group area, and causing display of the tab group in the tab strip with the tab group area depicted in the tab strip associated with the portion of the plurality of browser tabs and in an expanded state;

receiving a selection on the tab group area; and in direct response to receiving the selection:

changing the tab group from the expanded state to a collapsed state, setting a flag for a browser tab in the portion of the plurality of browser tabs based on an activity associated with a resource accessed by the browser tab and a tab group policy associated with the tab group, and pausing the activity based on the flag.

26. The computer-implemented method of claim 25, further comprising:

determining a topic associated with contents of the browser tab, generating a topic-related label for the tab group based on the topic, and setting, for display, a tab group name of the tab group to the topic-related label.

27. The computer-implemented method of claim 25, wherein the selection of the tab group area is a first selection, the method further comprising:

receiving a second selection on the tab group area; and in response to determining that the tab group is in the collapsed state:

changing the tab group from the collapsed state to the expanded state, setting the flag for the browser tab based on a starting condition related to the activity and associated with the browser tab and a threshold value, and starting the activity based on the flag.

* * * * *